US011852724B2

United States Patent
Crouch et al.

(10) Patent No.: US 11,852,724 B2
(45) Date of Patent: *Dec. 26, 2023

(54) LIDAR SYSTEM

(71) Applicant: BLACKMORE SENSORS & ANALYTICS, LLC, Bozeman, MT (US)

(72) Inventors: Stephen C. Crouch, Palo Alto, CA (US); Edward Angus, Palo Alto, CA (US); Michelle Milvich, Palo Alto, CA (US)

(73) Assignee: BLACKMORE SENSORS & ANALYTICS, LLC., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,376

(22) Filed: Dec. 20, 2022

(65) Prior Publication Data

US 2023/0119595 A1    Apr. 20, 2023

Related U.S. Application Data

(63) Continuation of application No. 17/147,550, filed on Jan. 13, 2021, now Pat. No. 11,561,304, which is a
(Continued)

(51) Int. Cl.
*G01S 17/42* (2006.01)
*G01S 17/931* (2020.01)
(Continued)

(52) U.S. Cl.
CPC ............ *G01S 17/42* (2013.01); *G01S 7/4817* (2013.01); *G01S 7/4915* (2013.01); *G01S 17/89* (2013.01); *G01S 17/931* (2020.01); *H04B 10/548* (2013.01)

(58) Field of Classification Search
CPC ...... G01S 17/42; G01S 7/4817; G01S 7/4915; G01S 17/89; G01S 17/931; G01S 7/4811;
(Continued)

(56) References Cited

U.S. PATENT DOCUMENTS

| 4,737,624 A | 4/1988 | Schwarte |
| 4,991,509 A | 2/1991 | Smith |

(Continued)

FOREIGN PATENT DOCUMENTS

| EP | 3 351 966 A2 | 7/2018 |
| JP | 2000-137076 A | 5/2000 |

(Continued)

OTHER PUBLICATIONS

Examination Report on CA Appl. Ser. No. 3111509 dated Mar. 25, 2021 (3 pages).
(Continued)

*Primary Examiner* — Alan D Hutchinson
(74) *Attorney, Agent, or Firm* — FOLEY & LARDNER LLP

(57) ABSTRACT

Techniques for optimizing a scan pattern of a LIDAR system including a bistatic transceiver include receiving first SNR values based on values of a range of the target, where the first SNR values are for a respective scan rate. Techniques further include receiving second SNR values based on values of the range of the target, where the second SNR values are for a respective integration time. Techniques further include receiving a maximum design range of the target at each angle in the angle range. Techniques further include determining, for each angle in the angle range, a maximum scan rate and a minimum integration time. Techniques further include defining a scan pattern of the LIDAR system based on the maximum scan rate and the minimum
(Continued)

integration time at each angle and operating the LIDAR system according to the scan pattern.

20 Claims, 23 Drawing Sheets

Related U.S. Application Data continuation of application No. 16/736,383, filed on Jan. 7, 2020, now Pat. No. 10,921,452, and a continuation of application No. PCT/US2019/046537, filed on Aug. 14, 2019.

(60) Provisional application No. 62/727,294, filed on Sep. 5, 2018.

(51) Int. Cl.
  *G01S 7/481* (2006.01)
  *G01S 7/4915* (2020.01)
  *G01S 17/89* (2020.01)
  *H04B 10/548* (2013.01)

(58) Field of Classification Search
  CPC ........ G01S 7/4818; G01S 7/497; G01S 17/26; G01S 7/481; H04B 10/548
  See application file for complete search history.

(56) References Cited

U.S. PATENT DOCUMENTS

| | | | |
|---|---|---|---|
| 5,006,721 | A | 4/1991 | Cameron et al. |
| 8,422,000 | B2 | 4/2013 | Harris et al. |
| 10,330,777 | B2 | 6/2019 | Popovich et al. |
| 10,921,452 | B2 | 2/2021 | Crouch et al. |
| 2006/0061753 | A1 | 3/2006 | Harris et al. |
| 2013/0258312 | A1 | 10/2013 | Lewis |
| 2014/0078514 | A1 | 3/2014 | Zhu |
| 2015/0146189 | A1 | 5/2015 | Kim |
| 2016/0162897 | A1 | 6/2016 | Feeney |
| 2017/0222814 | A1 | 8/2017 | Oberhauser et al. |
| 2017/0299697 | A1 | 10/2017 | Swanson |
| 2017/0316409 | A1 | 11/2017 | Smith et al. |
| 2018/0088235 | A1 | 3/2018 | Haslim et al. |
| 2018/0188355 | A1 | 7/2018 | Bao et al. |
| 2018/0224547 | A1 | 8/2018 | Crouch et al. |
| 2018/0284224 | A1 | 10/2018 | Weed et al. |
| 2018/0312125 | A1 | 11/2018 | Jung et al. |
| 2019/0154816 | A1 | 5/2019 | Hughes et al. |
| 2019/0277962 | A1 | 9/2019 | Ingram et al. |
| 2019/0302268 | A1 | 10/2019 | Singer et al. |
| 2019/0323885 | A1 | 10/2019 | Kamil et al. |
| 2020/0057142 | A1 | 2/2020 | Wang et al. |

FOREIGN PATENT DOCUMENTS

| | | |
|---|---|---|
| JP | 2004-529343 A | 9/2004 |
| JP | 2006-030147 A | 2/2006 |
| JP | 2012-202857 A | 10/2012 |
| WO | WO-2018/102188 A1 | 6/2018 |
| WO | WO-2018/107237 A1 | 6/2018 |
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/050959 A1 | 3/2020 |

OTHER PUBLICATIONS

Extended European Search Report on EP Appl. Ser. No. 19856858.6 dated Apr. 19, 2022 (8 pages).
Foreign Search Report on EP 19856858.6 dated Apr. 19, 2022.
International Preliminary Report and Written Opinion on Patentability on Appl. Ser. No. PCT/US2019/046537 dated Mar. 18, 2021 (8 pages).
International Search Report and Written Opinion on Appl. Ser. No. PCT/US2019/046537 dated Dec. 23, 2019 (15 pages).
Kachelmyer, A., "Range-Doppler Imaging with a Laser Radar", The Lincoln Laboratory Journal, vol. 3, No. 1, 1990, pp. 87-118.
Non-Final Office Action on U.S. Appl. No. 16/736,383 dated Mar. 10, 2020 (5 pages).
Notice of Allowance on U.S. Appl. No. 17/147,550 dated Oct. 12, 2022.
Notice of Allowance on U.S. Appl. No. 16/736,383 dated Oct. 13, 2020 (5 pages).
Notice of Reasons of Refusal on Appl. No. JP 2021-512417 dated Sep. 21, 2021 (10 pages).
Notice of Reasons of Refusal on JP Appl. Ser. 2021-512417 dated Jan. 11, 2022 (10 pages).
Notification for Reason for Refusal on KR 10-2021-7009705 dated Aug. 25, 2021 (4 pages).
Notification of Reason for Refusal on KR Appl. Ser. No. 10-2022-7004494 dated Mar. 28, 2022 (8 pages).
Official Action on CA Appl. Ser. No. 3111509 dated Oct. 27, 2021 (3 pages).
Third Party Submission on U.S. Appl. No. 16/725,375, filed Jun. 25, 2020 (73 pages).
Japanese Office Action issued in connection with JP Appl. Ser. No. 2022-102598 dated May 2, 2023.

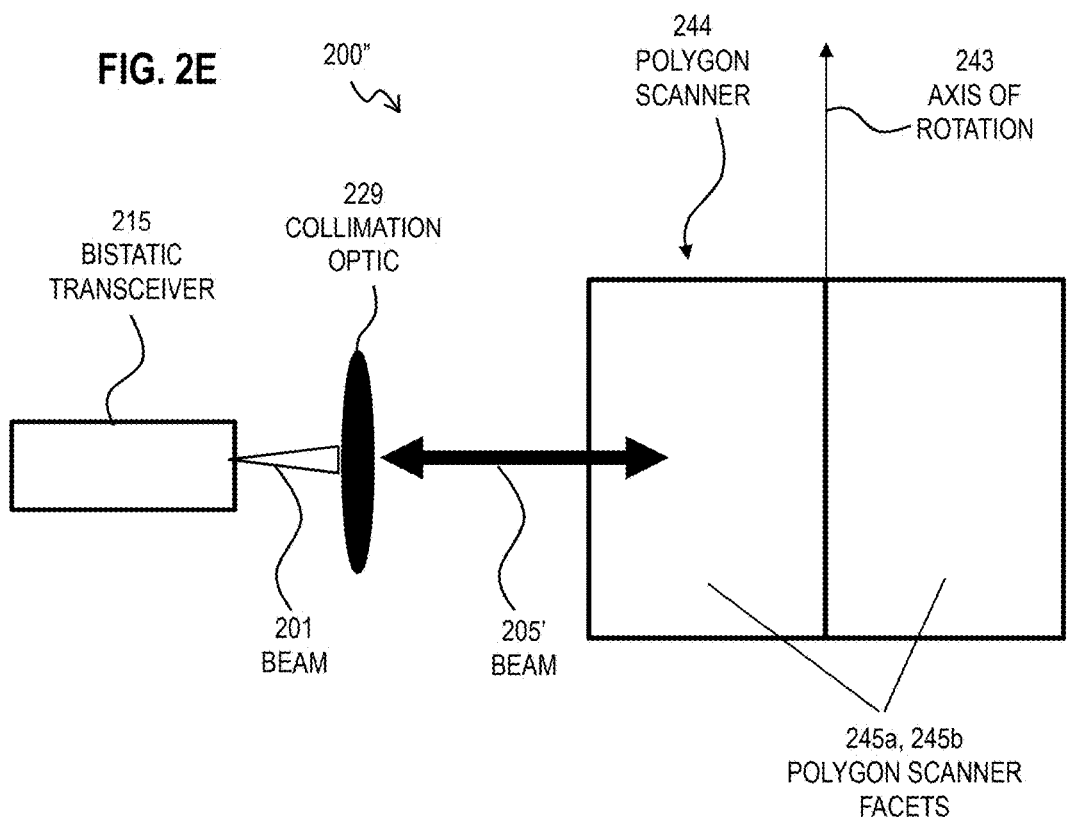
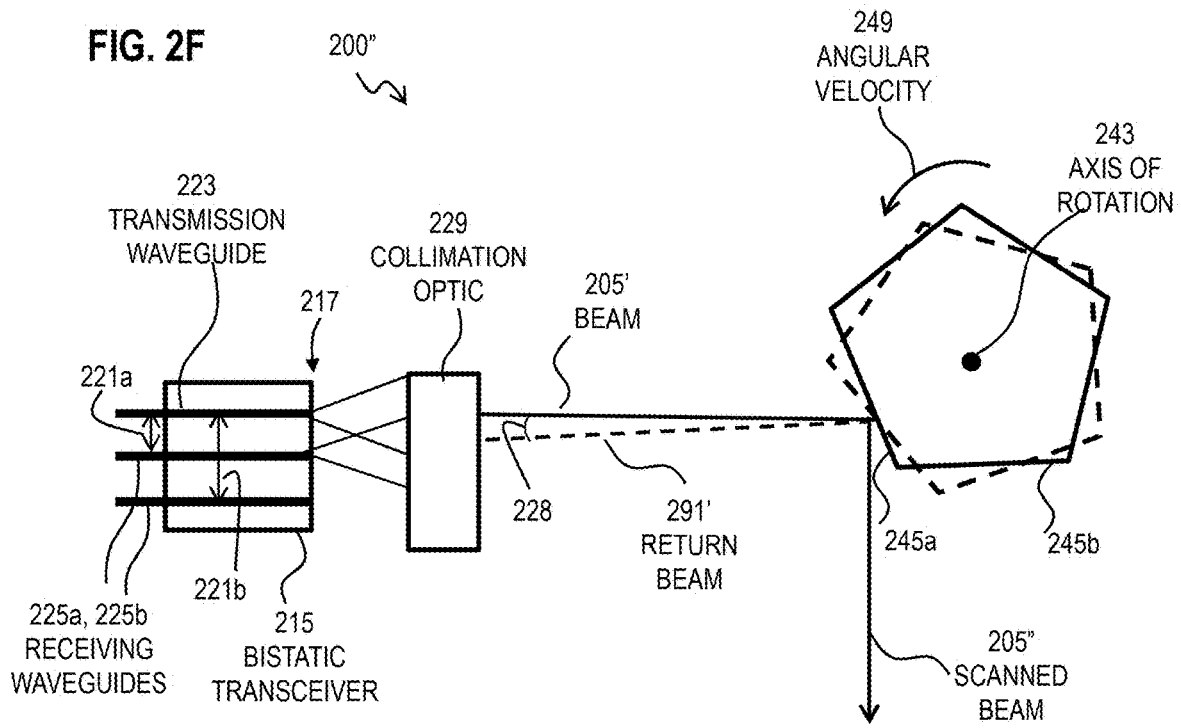

Allowable measurement rate (inverse of integration time) for various ranges

LIDAR SYSTEM

CROSS-REFERENCE TO RELATED APPLICATIONS

This application is a Continuation of U.S. patent application Ser. No. 17/147,550, filed Jan. 13, 2021, which is a Continuation of U.S. patent application Ser. No. 16/736,383, filed Jan. 7, 2020, which is a Continuation of International Application No. PCT/US2019/046537, filed Aug. 14, 2019, which claims benefit of and priority to U.S. Patent Application No. 62/727,294, filed Sep. 5, 2018. The entire disclosures of U.S. patent application Ser. No. 17/147,550, U.S. patent application Ser. No. 16/736,383, International Application No. PCT/US2019/046537, and U.S. Patent Application No. 62/727,294 are hereby incorporated by reference as if fully set forth herein.

BACKGROUND

Optical detection of range using lasers, often referenced by a mnemonic, LIDAR, for light detection and ranging, also sometimes called laser RADAR (radio-wave detection and ranging), is used for a variety of applications, from altimetry, to imaging, to collision avoidance. LIDAR provides finer scale range resolution with smaller beam sizes than conventional microwave ranging systems, such as RADAR. Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. Recent advances in LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Recent work by current inventors, show a novel arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications WO 2018/160240 and WO 2018/144853.

These improvements provide range, with or without target speed, in a pencil thin laser beam of proper frequency or phase content. When such beams are swept over a scene, information about the location and speed of surrounding objects can be obtained. This information is expected to be of value in control systems for autonomous vehicles, such as self-driving, or driver assisted, automobiles.

SUMMARY

The sampling and processing that provides range accuracy and target speed accuracy involve integration of one or more laser signals of various durations, in a time interval called integration time. To cover a scene in a timely way involves repeating a measurement of sufficient accuracy (involving one or more signals often over one to tens of microseconds) often enough to sample a variety of angles (often on the order of thousands) around the autonomous vehicle to understand the environment around the vehicle before the vehicle advances too far into the space ahead of the vehicle (a distance on the order of one to tens of meters, often covered in a particular time on the order of one to a few seconds). The number of different angles that can be covered in the particular time (often called the cycle or sampling time) depends on the sampling rate. It is here recognized that a tradeoff can be made between integration time for range and speed accuracy, sampling rate, and pattern of sampling different angles, with one or more LIDAR beams, to effectively determine the environment in the vicinity of an autonomous vehicle as the vehicle moves through that environment.

In a first set of embodiments, a method for optimizing a scan pattern of a LIDAR system on an autonomous vehicle includes receiving, on a processor, data that indicates first signal-to-noise ratio (SNR) values of a signal reflected by a target and received by a receiving waveguide of the bistatic transceiver after the signal is transmitted by a transmission waveguide of the bistatic transceiver that is spaced apart from the receiving waveguide by a separation. The first SNR values are based on values of a range of the target, and the first SNR values are for a respective value of a scan rate of the LIDAR system. The method further includes receiving, on the processor, data that indicates second SNR values of the signal based on values of the range of the target, where the second SNR values are for a respective value of an integration time of the LIDAR system. The method further includes receiving, on the processor, data that indicates a first angle and a second angle that defines an angle range of the scan pattern. The method further includes receiving, on the processor, data that indicates a maximum design range of the target at each angle in the angle range. The method further includes determining, for each angle in the angle range, a maximum scan rate of the LIDAR system based on a maximum value among of those scan rates where the first SNR value based on the maximum design range exceeds a minimum SNR threshold. The method further includes determining, for each angle in the angle range, a minimum integration time of the LIDAR system based on a minimum value among of those integration times where the second SNR value based on the maximum design range exceeds a minimum SNR threshold. The method further includes defining, with the processor, a scan pattern of the LIDAR system based on the maximum scan rate and the minimum integration time at each angle in the angle range. The method further includes operating the LIDAR system according to the scan pattern.

In other embodiments, a system or apparatus or computer-readable medium is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2E is a block diagram that illustrates a side view of example components of a bistatic LIDAR system, according to an embodiment;

FIG. 2F is a block diagram that illustrates a top view of the example components of FIG. 2E, according to an embodiment;

DETAILED DESCRIPTION

Figure 1A:
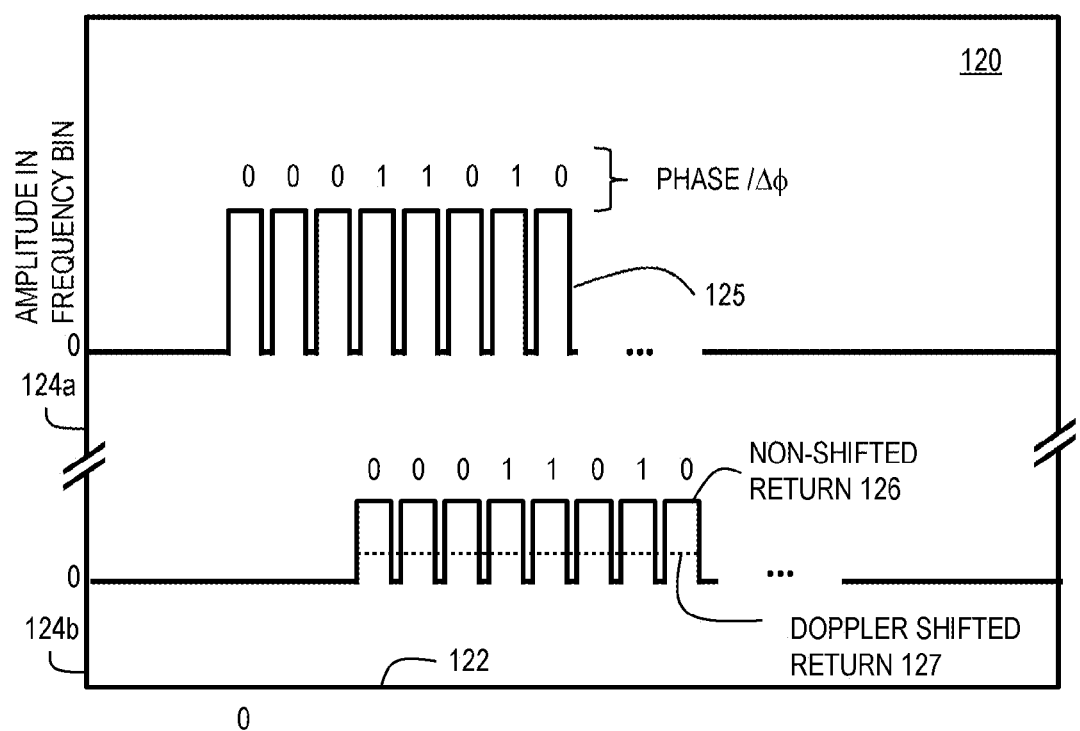
FIG. 1A is a schematic graph that illustrates the example transmitted signal of a series of binary digits along with returned optical signals for measurement of range, according to an embodiment.

A method and apparatus and system and computer-readable medium are described for scanning of a LIDAR system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a hi-res LIDAR system. One embodiment of the invention is described in the context of hi-res bistatic LIDAR system. Other embodiments of the invention are described in the context of single front mounted hi-res Doppler LIDAR system on a personal automobile; but, embodiments are not limited to this context. In other embodiments, one or multiple systems of the same type or other high resolution LIDAR, with or without Doppler components, with overlapping or non-overlapping fields of view or one or more such systems mounted on smaller or larger land, sea or air vehicles, piloted or autonomous, are employed.

1. Phase-Encoded Detection Overview

Using an optical phase-encoded signal for measurement of range, the transmitted signal is in phase with a carrier (phase=0) for part of the transmitted signal and then changes by one or more phases represented by the symbol $\Delta\phi$ (so phase=0, $\Delta\phi$, $2\Delta\phi$ . . . ) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi*\{0, 1, 2$ and $3\}$, which, for $\Delta\phi=\pi/2$ (90 degrees), equals $\{0, \pi/2, \pi$ and $3\pi/2\}$, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement in communications applications than ordinary PSK, since there is no need for the demodulator to have a copy of the reference signal to determine the exact phase of the received signal (thus, it is a non-coherent scheme).

For optical ranging applications, since the transmitter and receiver are in the same device, coherent PSK can be used. The carrier frequency is an optical frequency $f_C$ and a RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus, a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

FIG. 1A is a schematic graph 120 that illustrates the example transmitted signal as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency $f_C+f_0$ in arbitrary units relative to zero. The vertical axis 124b indicates amplitude of an optical returned signal at frequency $f_C+f_0$ in arbitrary units relative to zero; and, is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency $f_C+f_0$ and is not well detected in the expected frequency band, so the amplitude is diminished.

The observed frequency f' of the return differs from the correct frequency $f=f_C+f_0$ of the return by the Doppler effect given by Equation 1.

$$f' = \frac{(c+v_o)}{(c+v_s)} f \qquad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, $\Delta f=f'-f$, is the Doppler shift, $\Delta f_D$, which causes problems for the range measurement, and is given by Equation 2.

$$\Delta f_D = \left[\frac{(c+v_o)}{(c+v_s)} - 1\right] f \qquad (2)$$

Note that the magnitude of the error increases with the frequency f of the signal. Note also that for a stationary LIDAR system ($v_o=0$), for an object moving at 10 meters a second ($v_s=10$), and visible light of frequency about 500 THz, then the size of the Doppler shift is on the order of 16 megahertz (MHz, 1 MHz=$10^6$ hertz, Hz, 1 Hz=1 cycle per second). In various embodiments described below, the Doppler shift error is detected and used to process the data for the calculation of range.

In phase coded ranging, the arrival of the phase coded return is detected in the return signal by cross correlating the transmitted signal or other reference signal with the returned signal, implemented practically by cross correlating the code for a RF signal with an electrical signal from an optical detector using heterodyne detection and thus down-mixing back to the RF band. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms.

Note that the cross-correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R=c*\Delta t/2 \qquad (3)$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined; and, range R is not as readily produced.

Figure 1B:
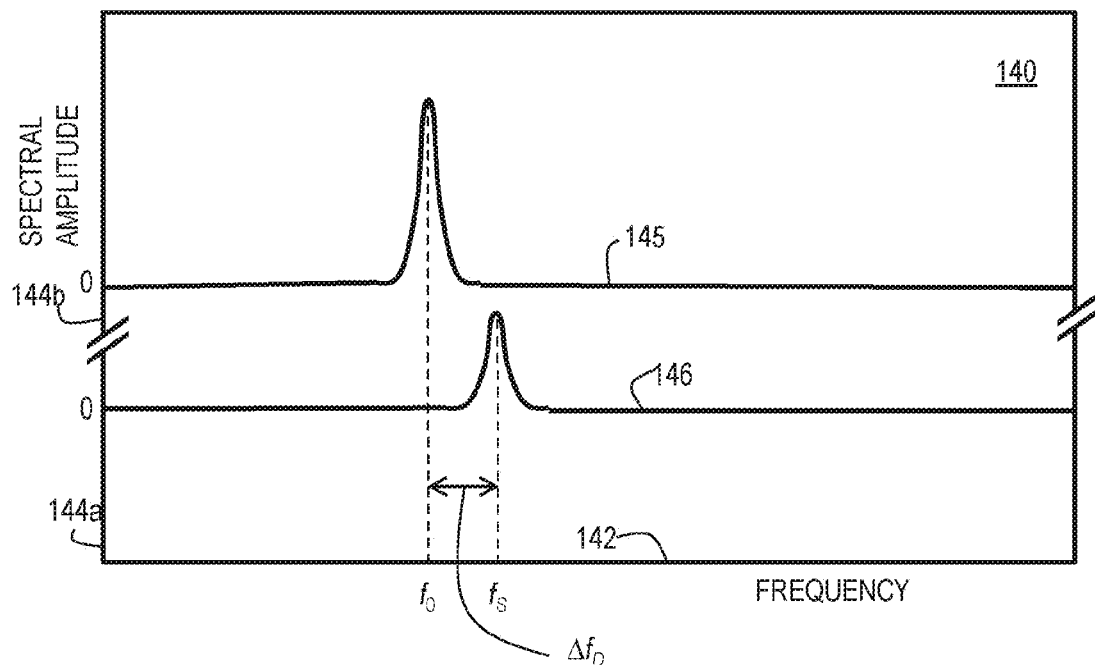
FIG. 1B is a schematic graph that illustrates an example spectrum of the reference signal and an example spectrum of a Doppler shifted return signal, according to an embodiment.

According to various embodiments of the inventor's previous work, the Doppler shift is determined in the electrical processing of the returned signal; and the Doppler shift is used to correct the cross-correlation calculation. Thus, a peak is more readily found and range can be more readily determined. FIG. 1B is a schematic graph 140 that illustrates an example spectrum of the transmitted signal and an example spectrum of a Doppler shifted complex return signal, according to an embodiment. The horizontal axis 142 indicates RF frequency offset from an optical carrier $f_C$ in arbitrary units. The vertical axis 144a indicates amplitude of a particular narrow frequency bin, also called spectral density, in arbitrary units relative to zero. The vertical axis 144b indicates spectral density in arbitrary units relative to zero; and, is offset from axis 144a to separate traces. Trace 145 represents a transmitted signal; and, a peak occurs at the proper RF $f_0$. Trace 146 represents an idealized (noiseless) complex return signal that is backscattered from an object that is moving toward the LIDAR system and is therefore Doppler shifted to a higher frequency (called blue shifted). The return does not have a peak at the proper RF, $f_0$; but, instead, is blue shifted by $\Delta f_D$ to a shifted frequency $f_S$. In practice, a complex return representing both in-phase and quadrature (I/Q) components of the return is used to determine the peak at $+\Delta f_D$, thus the direction of the Doppler shift, and the direction of motion of the target on the vector between the sensor and the object, is apparent from a single return.

Figure 1C:
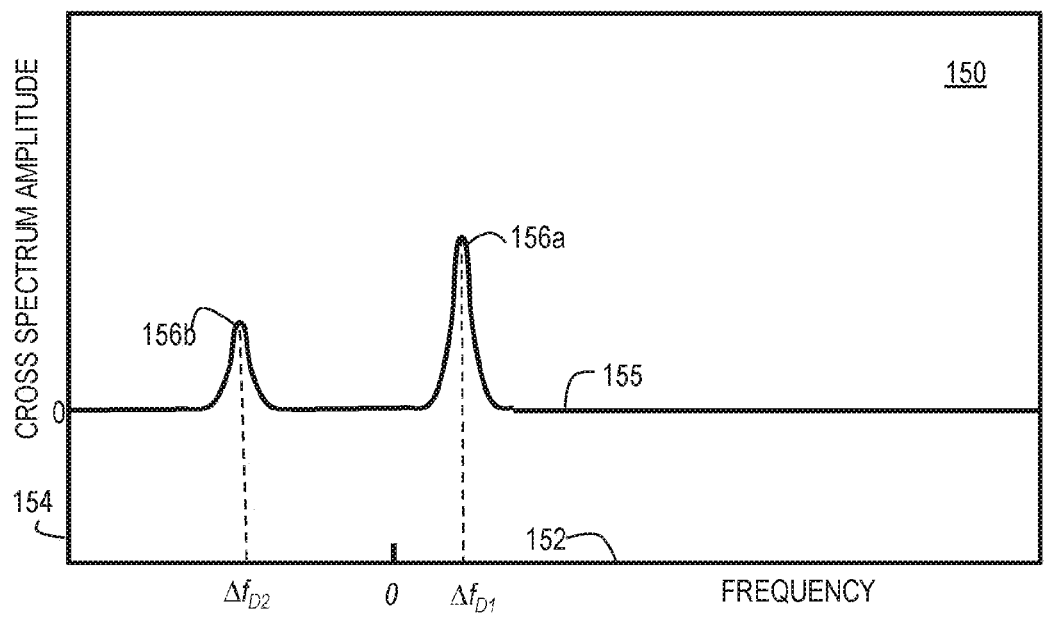
FIG. 1C is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1B, it is more efficient to take the cross spectrum of the in-phase and quadrature component of the down-mixed returned signal in the RF band. FIG. 1C is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1}=\Delta f_D$ in FIG. 1B) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus the Doppler shifts are determined. These shifts can be used to determine a signed velocity of approach of objects in the vicinity of the LIDAR, as can be critical for collision avoidance applications. However, if I/Q processing is not done, peaks appear at both +/−$\Delta f_{D1}$ and both +/−$\Delta f_{D2}$, so there is ambiguity on the sign of the Doppler shift and thus the direction of movement.

As described in more detail in inventor's previous work the Doppler shift(s) detected in the cross spectrum are used to correct the cross correlation so that the peak 135 is apparent in the Doppler compensated Doppler shifted return at lag $\Delta t$, and range R can be determined. In some embodiments simultaneous I/Q processing is performed as described in more detail in World Intellectual Property Organization publication WO 2018/144853 entitled "Method and system for Doppler detection and Doppler correction of optical phase-encoded range detection", the entire contents of which are hereby incorporated by reference as if fully set forth herein. In other embodiments, serial I/Q processing is used to determine the sign of the Doppler return as described in more detail in patent application publication entitled "Method and System for Time Separated Quadrature Detection of Doppler Effects in Optical Range Measurements" by S. Crouch et al., the entire contents of which are hereby incorporated by reference as if fully set forth herein. In other embodiments, other means are used to determine the Doppler correction; and, in various embodiments, any method known in the art to perform Doppler correction is used. In some embodiments, errors due to Doppler shifting are tolerated or ignored; and, no Doppler correction is applied to the range measurements.

2. Chirped Detection Overview

Figure 1D:
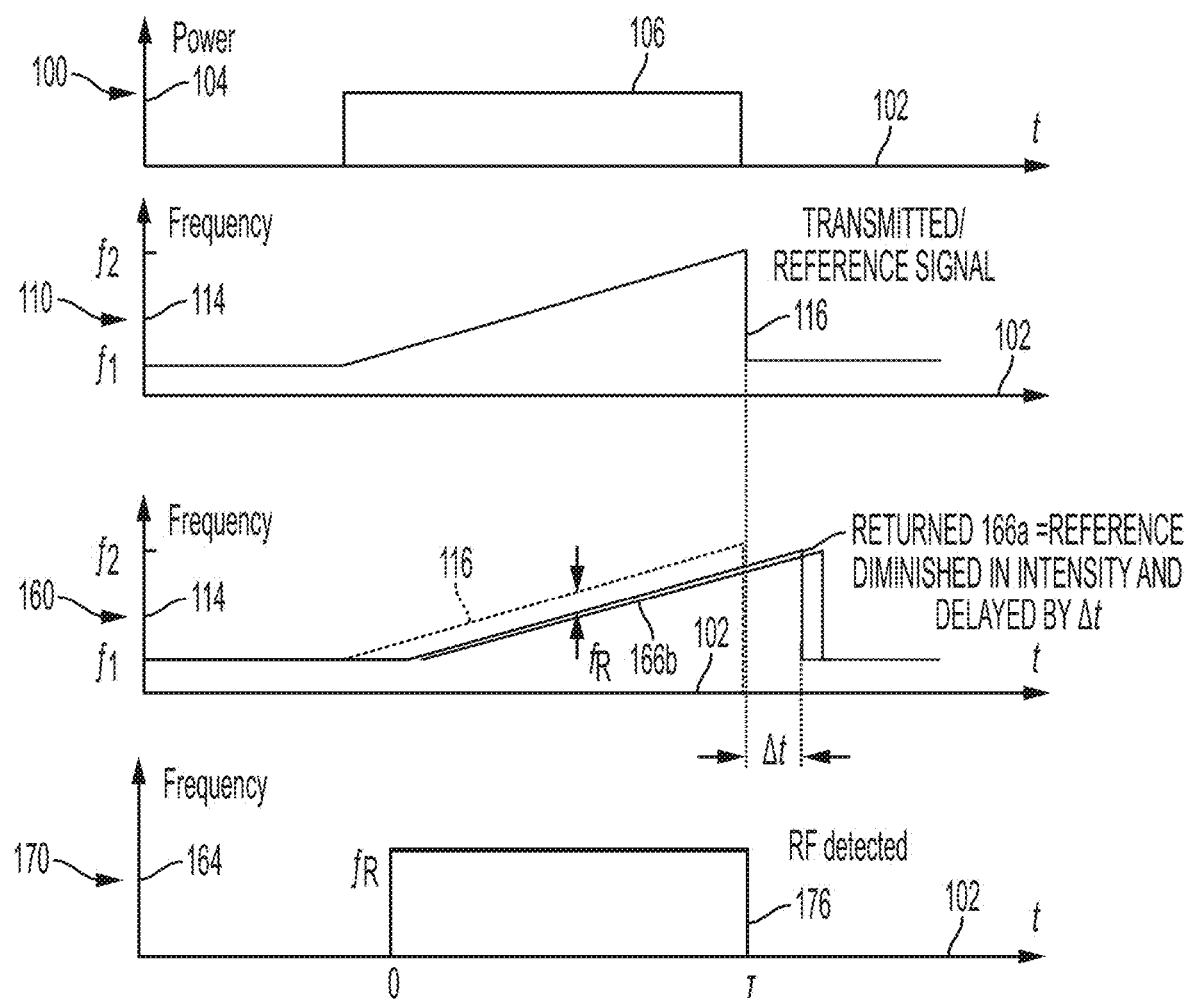
FIG. 1D is a set of graphs that illustrates an example optical chirp measurement of range, according to an embodiment.

FIG. 1D is a set of graphs that illustrates an example optical chirp measurement of range, according to an embodiment. The horizontal axis 102 is the same for all four graphs and indicates time in arbitrary units, on the order of milliseconds (ms, 1 ms=$10^{-3}$ seconds). Graph 100 indicates the power of a beam of light used as a transmitted optical signal. The vertical axis 104 in graph 100 indicates power of the transmitted signal in arbitrary units. Trace 106 indicates that the power is on for a limited pulse duration, $\tau$ starting at time 0. Graph 110 indicates the frequency of the transmitted signal. The vertical axis 114 indicates the frequency transmitted in arbitrary units. The trace 116 indicates that the frequency of the pulse increases from $f_1$ to $f_2$ over the duration $\tau$ of the pulse, and thus has a bandwidth B=$f_2-f_1$. The frequency rate of change is ($f_2-f_1$)/$\tau$.

The returned signal is depicted in graph 160 which has a horizontal axis 102 that indicates time and a vertical axis 114 that indicates frequency as in graph 110. The chirp 116 of graph 110 is also plotted as a dotted line on graph 160. A first returned signal is given by trace 166a, which is just the transmitted reference signal diminished in intensity (not shown) and delayed by $\Delta t$. When the returned signal is received from an external object after covering a distance of 2R, where R is the range to the target, the returned signal start at the delayed time $\Delta t$ is given by 2R/c, where c is the speed of light in the medium (approximately 3×$10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R=(f_2-f_1)/\tau*2R/c=2BR/c\tau \quad (4a)$$

The value of $f_R$ is measured by the frequency difference between the transmitted signal 116 and returned signal 166a in a time domain mixing operation referred to as de-chirping. So the range R is given by Equation 4b.

$$R=f_R c\tau/2B \quad (4b)$$

Of course, if the returned signal arrives after the pulse is completely transmitted, that is, if 2R/c is greater than $\tau$, then Equations 4a and 4b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot (pencil beam cross section) illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 160 by trace 166b. This will have a different measured value of $f_R$ that gives a different range using Equation 4b. In some circumstances, multiple additional returned signals are received.

Graph 170 depicts the difference frequency $f_R$ between a first returned signal 166a and the reference chirp 116. The horizontal axis 102 indicates time as in all the other aligned graphs in FIG. 1D, and the vertical axis 164 indicates frequency difference on a much-expanded scale. Trace 176 depicts the constant frequency $f_R$ measured in response to the transmitted chirp, which indicates a particular range as given by Equation 4b. The second returned signal 166b, if present, would give rise to a different, larger value of $f_R$ (not shown) during de-chirping; and, as a consequence yield a larger range using Equation 4b.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990, the entire contents of which are hereby incorporated by reference as if fully set forth herein, except for terminology inconsistent with that used herein. The disadvantage is that the digitizer bandwidth requirement is generally higher. The positive aspects of coherent detection are otherwise retained.

In some embodiments, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

Figure 1E:
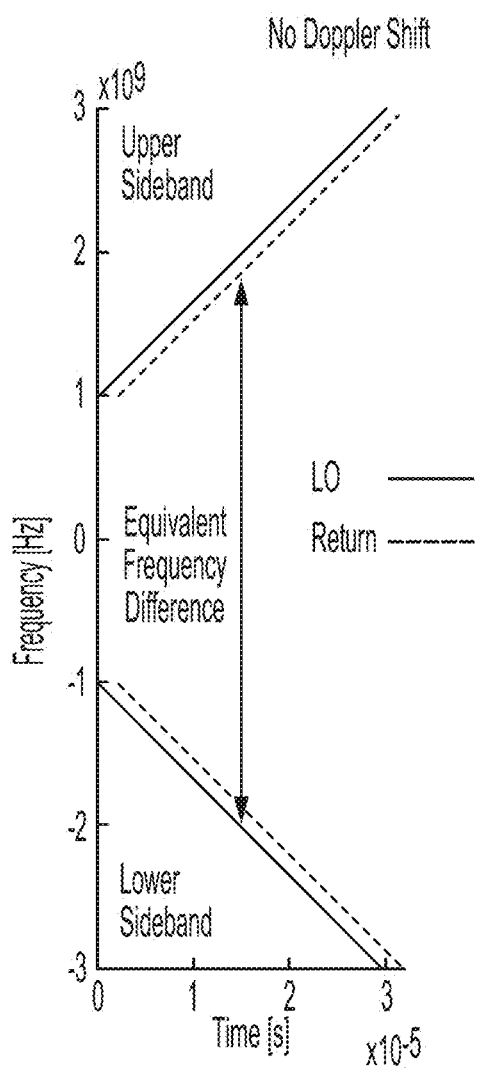
FIG. 1E is a graph using a symmetric LO signal, and shows the return signal in this frequency time plot as a dashed line when there is no Doppler shift, according to an embodiment.

FIG. 1E is a graph using a symmetric LO signal, and shows the return signal in this frequency time plot as a dashed line when there is no Doppler shift, according to an embodiment. The horizontal axis indicates time in example units of $10^{-5}$ seconds (tens of microseconds). The vertical axis indicates frequency of the optical transmitted signal relative to the carrier frequency $f_c$ or reference signal in example units of gigaHertz (GHz, 1 GHz=$10^9$ Hertz). During a pulse duration, a light beam comprising two optical frequencies at any time is generated. One frequency increases from $f_1$ to $f_2$ (e.g., 1 to 2 GHz above the optical carrier) while the other frequency simultaneously decreases from $f_4$ to $f_3$ (e.g., 1 to 2 GHz below the optical carrier) The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1<f_2<f_p<f_3<f_4$. Though, in the illustrated embodiment, the higher frequencies provide the up chirp and the lower frequencies provide the down chirp, in other embodiments, the higher frequencies produce the down chirp and the lower frequencies produce the up chirp.

In some embodiments, two different laser sources are used to produce the two different optical frequencies in each beam at each time. However, in some embodiments, a single optical carrier is modulated by a single RF chirp to produce symmetrical sidebands that serve as the simultaneous up and down chirps. In some of these embodiments, a double sideband Mach-Zehnder intensity modulator is used that, in general, does not leave much energy in the carrier frequency; instead, almost all of the energy goes into the sidebands.

As a result of sideband symmetry, the bandwidth of the two optical chirps will be the same if the same order sideband is used. In other embodiments, other sidebands are used, e.g., two second order sideband are used, or a first order sideband and a non-overlapping second sideband is used, or some other combination.

As described in publication WO 2018/160240, entitled "Method and System for Doppler Detection and Doppler Correction of Optical Chirped Range Detection," the entire contents of which are hereby incorporated by reference as if fully set forth herein, when selecting the transmit (TX) and local oscillator (LO) chirp waveforms, it is advantageous to ensure that the frequency shifted bands of the system take maximum advantage of available digitizer bandwidth. In general, this is accomplished by shifting either the up chirp or the down chirp to have a range frequency beat close to zero.

Figure 1F:
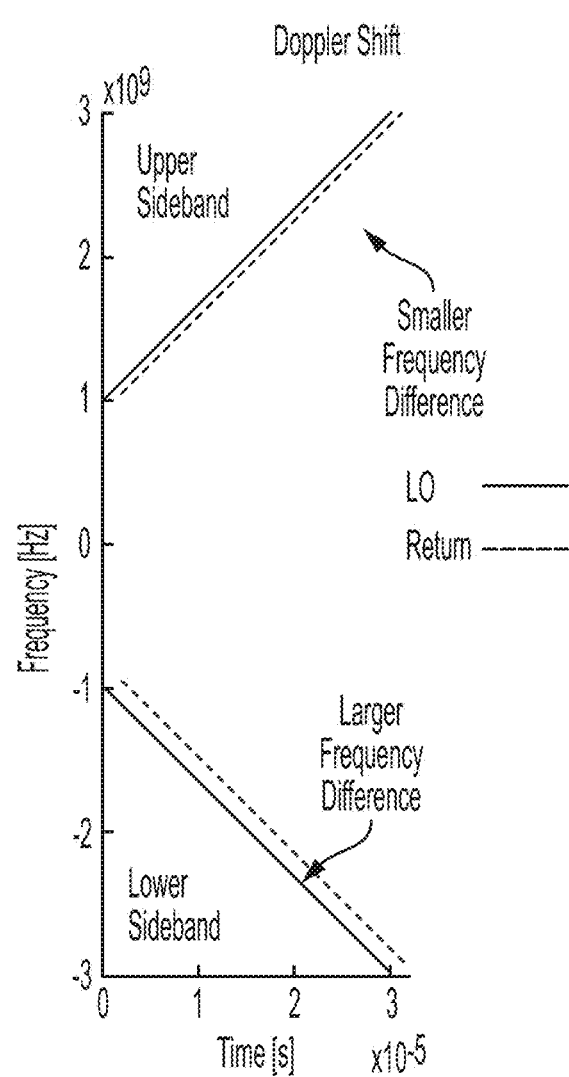
FIG. 1F is a graph similar to FIG. 1E, using a symmetric LO signal, and shows the return signal in this frequency time plot as a dashed line when there is a non-zero Doppler shift, according to an embodiment.

FIG. 1F is a graph similar to FIG. 1E, using a symmetric LO signal, and shows the return signal in this frequency time plot as a dashed line when there is a non-zero Doppler shift. For example, if the blue shift causing range effects is $f_B$, then the beat frequency of the up chirp will be increased by the offset and occur at $f_B+\Delta f_S$ and the beat frequency of the down chirp will be decreased by the offset to $f_B-\Delta f_S$. Thus, the up chirps will be in a higher frequency band than the down chirps, thereby separating them. If $\Delta f_S$ is greater than any expected Doppler effect, there will be no ambiguity in the ranges associated with up chirps and down chirps. The measured beats can then be corrected with the correctly signed value of the known $\Delta f_S$ to get the proper up-chirp and down-chirp ranges. In the case of a chirped waveform, the time separated I/Q processing (aka time domain multiplexing) can be used to overcome hardware requirements of other approaches as described above. In that case, an AOM is used to break the range-Doppler ambiguity for real valued signals. In some embodiments, a scoring system is used to pair the up and down chirp returns as described in more detail in the above cited publication. In other embodiments, I/Q processing is used to determine the sign of the Doppler chirp as described in more detail above.

3. Optical Detection Hardware Overview

Figure 2A:
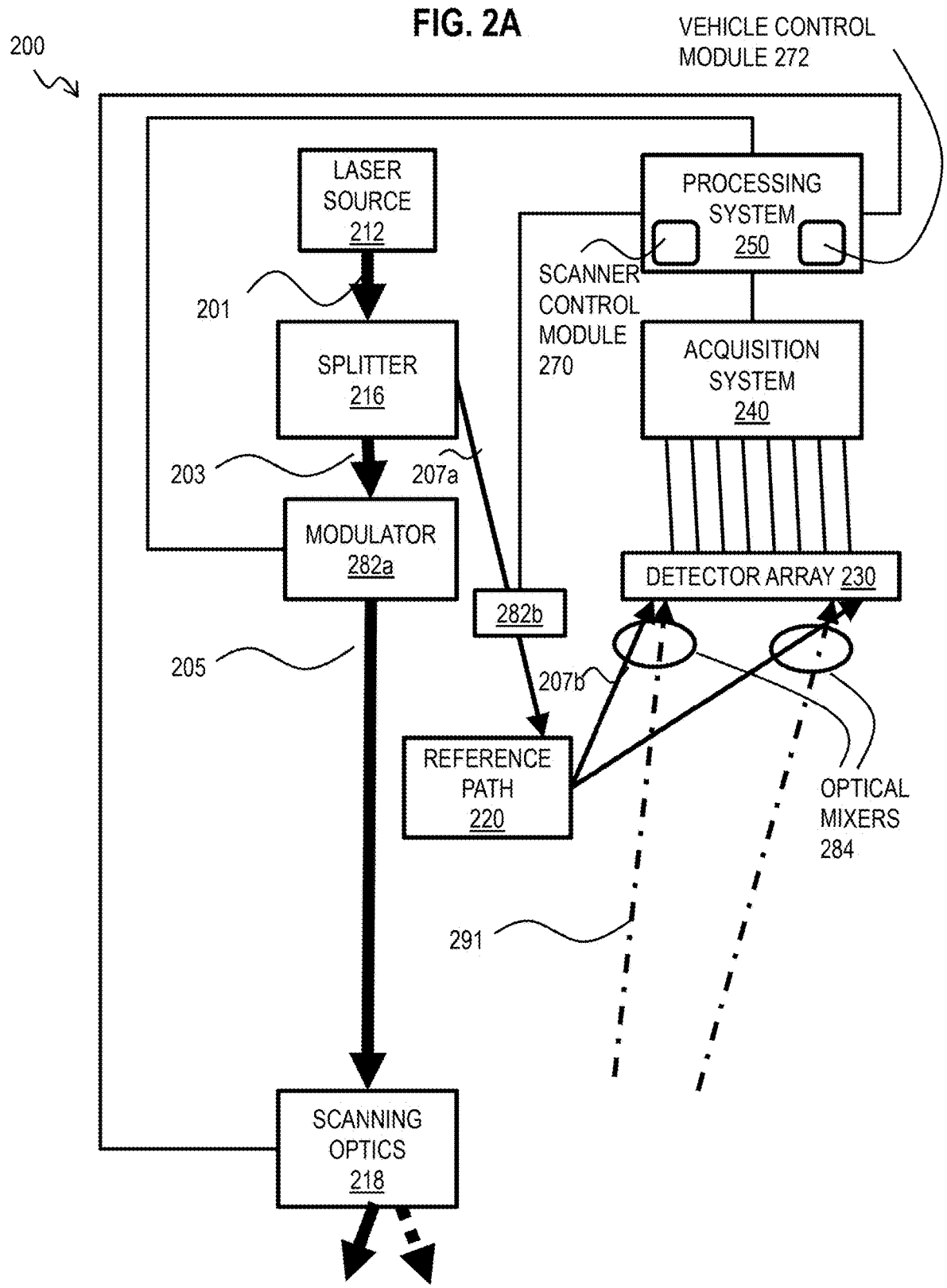
FIG. 2A is a block diagram that illustrates example components of a high resolution (hi res) LIDAR system, according to an embodiment.

In order to depict how to use hi-res range-Doppler detection systems, some generic hardware approaches are described. FIG. 2A is a block diagram that illustrates example components of a high-resolution range LIDAR system 200, according to an embodiment. Optical signals are indicated by arrows. Electronic wired or wireless connections are indicated by segmented lines without arrowheads. A laser source 212 emits a carrier wave 201 that is phase or frequency modulated in modulator 282a, before or after splitter 216, to produce a phase coded or chirped optical signal 203 that has a duration D. A splitter 216 splits the modulated (or, as shown, the unmodulated) optical signal for use in a reference path 220. A target beam 205, also called transmitted signal herein, with most of the energy of the beam 201 is produced. A modulated or unmodulated reference beam 207a with a much smaller amount of energy that is nonetheless enough to produce good mixing with the returned light 291 scattered from an object (not shown) is also produced. In the illustrated embodiment, the reference beam 207a is separately modulated in modulator 282b. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from an object outside the LIDAR within a spread of ranges of interest. In some embodiments, the reference beam 207b is called the local oscillator (LO) signal referring to older approaches that produced the reference beam 207b locally from a separate oscillator. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, often through some scanning optics 218. The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers 284 to produce an optical signal of characteristics to be properly detected. The frequency, phase or amplitude of the interference pattern, or some combination, is recorded by acquisition system 240 for each detector at multiple times during the signal duration D. The number of temporal samples processed per signal duration or integration time affects the down-range extent. The number or integration time is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 250, such as a computer system described below with reference to FIG. 7, or a chip set described below with reference to FIG. 8. A scanner control module 270 provides scanning signals to drive the scanning optics 218, according to one or more of the embodiments described below. In one embodiment, the scanner control module 270 includes instructions to perform one or more steps of the method 600 described below with reference to the flowchart of FIG. 6. A signed Doppler compensation module (not shown) in processing system 250 determines the sign and size of the Doppler shift and the corrected range based thereon along with any other corrections. The processing system 250 also includes a modulation signal module (not shown) to send one or more electrical signals that drive modulators 282a, 282b. In some embodiments, the processing system also includes a vehicle control module 272 to control a vehicle on which the system 200 is installed.

Any known apparatus or system may be used to implement the laser source 212, modulators 282a, 282b, beam splitter 216, reference path 220, optical mixers 284, detector array 230, scanning optics 218, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

FIG. 2A also illustrates example components for a simultaneous up and down chirp LIDAR system according to one embodiment. In this embodiment, the modulator 282a is a frequency shifter added to the optical path of the transmitted beam 205. In other embodiments, the frequency shifter is added instead to the optical path of the returned beam 291 or to the reference path 220. In general, the frequency shifting element is added as modulator 282b on the local oscillator (LO, also called the reference path) side or on the transmit side (before the optical amplifier) as the device used as the modulator (e.g., an acousto-optic modulator, AOM) has some loss associated and it is disadvantageous to put lossy components on the receive side or after the optical amplifier. The purpose of the optical shifter is to shift the frequency of the transmitted signal (or return signal) relative to the frequency of the reference signal by a known amount $\Delta f_S$, so that the beat frequencies of the up and down chirps occur in different frequency bands, which can be picked up, e.g., by the FFT component in processing system 250, in the analysis of the electrical signal output by the optical detector 230. In some embodiments, the RF signal coming out of the balanced detector is digitized directly with the bands being separated via FFT. In some embodiments, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Both embodiments offer pathways that match the bands of the detected signals to available digitizer resources. In some embodiments, the modulator 282a is excluded (e.g. in direct ranging embodiments).

Figure 2B:
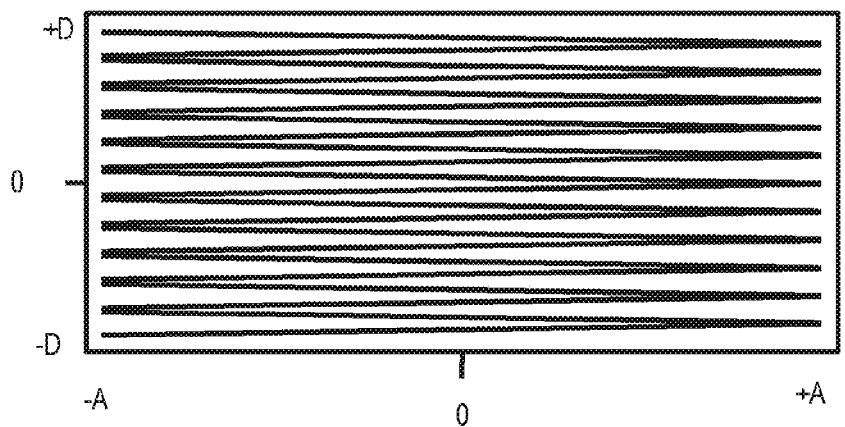
FIG. 2B is a block diagram that illustrates a saw tooth scan pattern for a hi-res Doppler system, used in some embodiments.

FIG. 2B is a block diagram that illustrates a simple saw tooth scan pattern for a hi-res Doppler system, used in some prior art embodiments. The scan sweeps through a range of azimuth angles (horizontally) and inclination angles (vertically above and below a level direction at zero inclination). In various embodiments described below, other scan patterns are used. Any scan pattern known in the art may be used in various embodiments. For example, in some embodiments, adaptive scanning is performed using methods described in World Intellectual Property Organization publications WO 2018/125438 and WO 2018/102188, the entire contents of each of which are hereby incorporated by reference as if fully set forth herein.

Figure 2C:
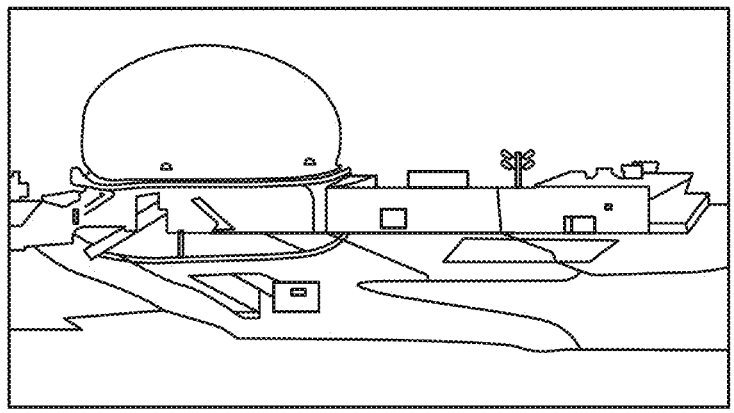
FIG. 2C is an image that illustrates an example speed point cloud produced by a hi-res Doppler LIDAR system, according to an embodiment.

FIG. 2C is an image that illustrates an example speed point cloud produced by a hi-res Doppler LIDAR system, according to an embodiment. Each pixel in the image represents a point in the point cloud which indicates range or intensity or relative speed or some combination at the inclination angle and azimuth angle associated with the pixel.

Figure 2D:
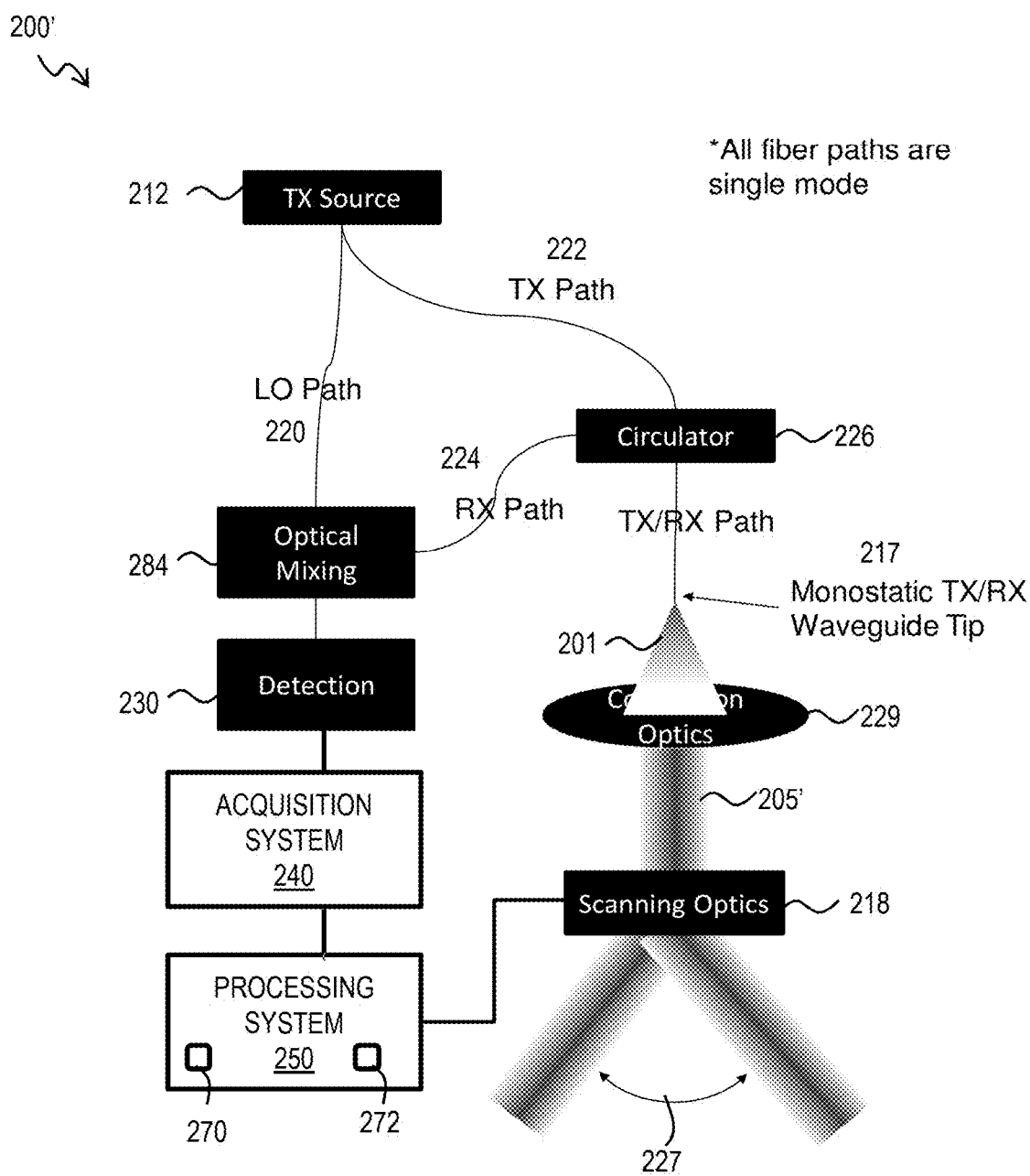
FIG. 2D is a block diagram that illustrates example components of a high resolution (hi res) LIDAR system, according to an embodiment.

FIG. 2D is a block diagram that illustrates example components of a high resolution (hi res) LIDAR system 200', according to an embodiment. In an embodiment, the system 200' is similar to the system 200 with the exception of the features discussed herein. In an embodiment, the system 200' is a coherent LIDAR system that is constructed with monostatic transceivers. The system 200' includes the source 212 that transmits the carrier wave 201 along a single-mode optical waveguide over a transmission path 222, through a circulator 226 and out a tip 217 of the single-mode optical waveguide that is positioned in a focal plane of a collimating optic 229. In an embodiment, the tip 217 is positioned within a threshold distance (e.g. about 100 µm) of the focal plane of the collimating optic 229 or within a range from about 0.1% to about 0.5% of the focal length of the collimating optic 229. In another embodiment, the collimating optic 229 includes one or more of doublets, aspheres or multi-element designs. In an embodiment, the carrier wave 201 exiting the optical waveguide tip 217 is shaped by the optic 229 into a collimated target beam 205' which is scanned over a range of angles 227 by scanning optics 218. In some embodiments, the carrier wave 201 is phase or frequency modulated in a modulator 282a upstream of the collimation optic 229. In other embodiments, modulator 282 is excluded. In an embodiment, return beams 291 from an object are directed by the scanning optics 218 and focused by the collimation optics 229 onto the tip 217 so that the return beam 291 is received in the single-mode optical waveguide tip 217. In an embodiment, the return beam 291 is then redirected by the circulator 226 into a single mode optical waveguide along the receive path 224 and to optical mixers 284 where the return beam 291 is combined with the reference beam 207b that is directed through a single-mode optical waveguide along a local oscillator path 220. In one embodiment, the system 200' operates under the principal that maximum spatial mode overlap of the returned beam 291 with the reference signal 207b will maximize heterodyne mixing (optical interference) efficiency between the returned signal 291 and the local oscillator 207b. This monostatic arrangement is advantageous as it can help to avoid challenging alignment procedures associated with bi-static LIDAR systems.

FIG. 2E is a block diagram that illustrates an example cross-sectional side view of example components of a bistatic LIDAR system 200", according to an embodiment. FIG. 2F is a block diagram that illustrates a top view of the example components of the bistatic LIDAR system 200" of FIG. 2E, according to an embodiment. In an embodiment, the bistatic LIDAR system 200" is similar to the system 200' of FIG. 2D with the inclusion of the features discussed herein.

In an embodiment, the system 200" includes a bistatic transceiver 215 that includes a transmission waveguide 223 and one or more receiving waveguides 225a, 225b. The first receiving waveguide 225a is spaced apart from the transmission waveguide 223 by a separation 221a. This separation of receiving waveguide from transmission waveguide is called a pitch catch arrangement because the light is emitted (pitched) at one location and received (caught) at a different location. The second receiving waveguide 225b is spaced apart from the transmission waveguide 223 by a separation 221b that is greater than the spacing 221a. Although FIG. 2F depicts two receiving waveguides 225a, 225b, the system is not limited to two receiving waveguides and could include one or more than two receiving waveguides. In an example embodiment, the bistatic transceiver 215 is supported by on-chip waveguide technology such as planar light circuits that allow the manufacture of closely spaced waveguides to act as the bi-static transceiver aperture. In an example embodiment, the bistatic transceiver 215 features planar lightwave circuit technology developed by NeoPhotonics® Corporation of San Jose, California. In another example embodiment, the bistatic transceiver 215 is custom made with minimal modification to standard manufacturing processes of planar lightwave circuit technologies. In yet another example embodiment, the bistatic transceiver 215 is manufactured by PLC Connections® of Columbus Ohio.

In an embodiment, in the system 200" the source 212 transmits the carrier wave as a beam 201 along the transmission waveguide 223 over the transmission path 222 to a tip 217 of the transmission waveguide 223. In one embodiment, the system 200" excludes the circulator 226 which advantageously reduces the cost and complexity of the system 200". The carrier wave 201 exiting the tip 217 of the transmission waveguide 223 is shaped by the collimation optic 229 into the collimated target beam 205' as in the system 200'.

In an embodiment, the scanning optics 218 is a polygon scanner 244 with a plurality of mirrors or facets 245a, 245b and configured to rotate with an angular velocity 249 about an axis of rotation 243. In one embodiment, the polygon scanner 244 is configured to rotate at a constant speed about the axis of rotation 243. In an example embodiment, the polygon scanner 244 has one or more of the following characteristics: manufactured by Blackmore® Sensors with Copal turned mirrors, has an inscribed diameter of about 2 inches or in a range from about 1 inch to about 3 inches, each mirror is about 0.5 inches tall or in a range from about 0.25 inches to about 0.75 inches, has an overall height of about 2.5 inches or in a range from about 2 inches to about 3 inches, is powered by a three-phase Brushless Direct Current (BLDC) motor with encoder pole-pair switching, has a rotation speed in a range from about 1000 revolutions per minute (rpm) to about 5000 rpm, has a reduction ratio of about 5:1 and a distance from the collimator 231 of about 1.5 inches or in a range from about 1 inch to about 2 inches. In other embodiments, the scanning optics 218 of the system 200" is any optic other than the polygon scanner 244.

In an embodiment, the collimated target beam 205' is reflected off one of the polygon facets 245 into a scanned beam 205" and is scanned through the range of angles 227 as the polygon scanner 244 rotates at the angular velocity 249. In one embodiment, the bistatic transceiver 215 including the transmission waveguide 223 and receiving waveguides 225 are arranged in a first plane (e.g. plane of FIG. 2F) and the polygon scanner 244 adjusts the direction of the beam 205" over the range of angles 227 in the same first plane (or in a plane parallel to the first plane). In another embodiment, the first plane is orthogonal to the axis of rotation 243. For purposes of this description, "parallel" means within ±10 degrees and "orthogonal" means within 90±10 degrees.

In an embodiment, the beam 205" is backscattered by a target positioned at a range and the return beam 291' is reflected by one of the facets 245 after a slight movement of the facets indicated by the dashed outline to the collimation optic 229 which focuses the return beam 291' into an offset position of the tip 217 of the receiving waveguide 225a or 225b, among others, if any, collectively referenced hereinafter as receiving waveguide 225. The offset produced by the rotating polygon is utilized in various embodiments to space the separation between transmitting and receiving waveguides to improve the signal to noise ratio (SNR) of the system 200".

As depicted in FIG. 2F, the polygon scanner 244 rotates from a first orientation (e.g. solid line) to a second orientation (e.g. dotted line) during the round trip time to the target, e.g. between the time that the beam 205" is reflected from the facet 245a to the target and the time that the return beam 291' is reflected by the facet 245a to the optic 229. In one embodiment, the rotation of the facet 245a between these times accounts for the return beam 291' being deflected by the facet 245a at an angle 228 relative to the incident beam 205'. In an embodiment, the target range (e.g. based on the round trip time) and/or the rotation speed of the polygon scanner 244 and/or a diameter of an image 418 (FIG. 4E) of the return beam 291' on the bistatic transceiver 215 determine the angle 228 and hence the separation 221a that is selected to position the receiving waveguide 225a relative to the transmission waveguide 223 so the return beam 291' is focused in the tip of the receiving waveguide 225a. In an embodiment, equation 5 expresses the relationship between the separation 221, the rotation speed of the polygon scanner 244 and the target range:

$$y = \text{focal length} * \text{rotation rate} * \frac{c}{2 * \text{range}} \quad (5)$$

where y is the separation 221, focal length is the focal length of the collimation optic 229 (in units of meters); rotation rate is the rotation speed of the polygon scanner 244 (in units of radians per second), c is the speed of light (in units of meters per second) and range is the target range (in units of meters).

In an embodiment, the values of one or more parameters of the system 200" are selected during a design phase of the system 200" to optimize the signal to noise ratio (SNR) of the return beam 291'. In one embodiment, the values of these parameters include the value of the rotation speed of the polygon scanner 244 that is selected based on a target design range over the range of angles 227 to optimize the SNR. FIG. 4G is a graph that illustrates an example of SNR versus target range for various scan rates in the system 200" of FIG. 2E, according to an embodiment. The horizontal axis 402 is target range in units of meters (m) and the vertical axis 404 is SNR in units of decibels (dB). A first trace 440d depicts the SNR of the focused return beam 291' on the tip 217 of the receiving waveguide 225 based on target range where the beam is not scanned. A second trace 440b depicts the SNR of the focused return beam 291' on the tip 217 of the receiving waveguide 225 based on target range where the beam is scanned at a slow scan rate (e.g. about 2500 degrees per second). A third trace 440c depicts the SNR of the focused return beam 291' on the tip 217 of the receiving waveguide 225 based on target range where the beam is scanned at an optimal scan rate (e.g. about 5500 deg/sec). An SNR threshold 442 (e.g., about 10 dB) is also depicted. Thus, when designing the system 200" a user first determines the target design range over the range of angles (e.g. 0 m-150 m) and then uses FIG. 4G to quickly determine which of the traces 440b, 440c, 440d maintains an SNR above the SNR threshold 442 over that target design range. In this example embodiment, the trace 440c maintains an SNR above the SNR threshold 442 over the target design range (e.g. 0 m-150 m) and thus the user selects the optimal scan speed (e.g. about 5500 deg/sec) associated with the trace 440c in designing the system 200". Accordingly, the polygon scanner 244 is set to have a fixed rotation speed based on this optimal scan speed. Thus, the traces 440 advantageously provide an efficient way for a user to design a system 200", specifically when selecting the fixed scan speed of the polygon scanner 244. In an embodiment, each trace 440 is generated using the system 200" and measuring the SNR of the return beam 291' at each scan speed of the polygon scanner associated with each trace 440. The traces 440 are not limited to those depicted in FIG. 4G and include any SNR traces that are generated using similar means.

In another embodiment, the values of the design parameter that is selected during the design phase of the system 200" includes the value of the separation 221 that is selected based on a scan speed of the polygon scanner 244 and a target design range over the range of angles 227 to optimize the SNR. FIG. 4K is a graph that illustrates an example of SNR versus target range for various separation 221 values in the system 200" of FIG. 2E at a low fixed scan speed (e.g. 4000 deg/sec), according to an embodiment. The horizontal axis 402 is target range in units of meters (m) and the vertical axis 404 is SNR in units of decibels (dB). A first trace 464a depicts the SNR of the focused return beam 291' on the tip 217 of the receiving waveguide 225 based on target range for a separation 221 of 4 $w_o$ where $w_o$ is a diameter of the transmission waveguide 223. A second trace 464b depicts the SNR of the focused return beam 291' on the tip 217 of the receiving waveguide 225 based on target range for a separation 221 of 0 (e.g. 0 $w_o$). Each trace 464 between the first trace 464a and second trace 464b represents a 0.25 $w_o$ decrement in the separation 221 value. In one embodiment, for a target design range (e.g. 0 m-250 m) the trace 464c is selected since it has an SNR value above the SNR threshold 442 over the target design range. The separation value 221 associated with the trace 464c is 0.25 $w_o$ and hence the separation 221 is set at 0.25 $w_o$ when designing the system 200" with the target design range (e.g. 0 m-250 m) and the low fixed scan speed (e.g. 4000 deg/sec). FIG. 4L is a graph that depicts a plurality of SNR traces 466 for the system 200" with the low fixed scan speed (e.g. 4000 deg/sec). For a specific design target range (e.g. 250 m) along the horizontal axis 402, the SNR traces 466 communicate a value of the separation 221 (along the vertical axis 409) that is able to maintain an SNR level associated with the trace 466. In an example embodiment, for the design target range of 250 m, trace 466a indicates that an SNR of 18 dB can be maintained at multiple values of the separation 221 (e.g. about 0.25 $w_o$ and about 2.75 $w_o$) and thus gives the user different options when designing the system 200". In addition to FIG. 4K, the traces 466 provide a quick look up means for a user when designing a system 200" based on a known design target range and fixed scan speed. In an embodiment, as with the traces 464 of FIG. 4K, the traces 466 are generated using the system 200" by measuring the SNR of the return beam 291' at multiple separation 221 values across multiple target range values. Additionally, the traces 466 are not limited to those depicted in FIG. 4L; but can be simulated or measured using other equipment parameters.

Figure 4A:
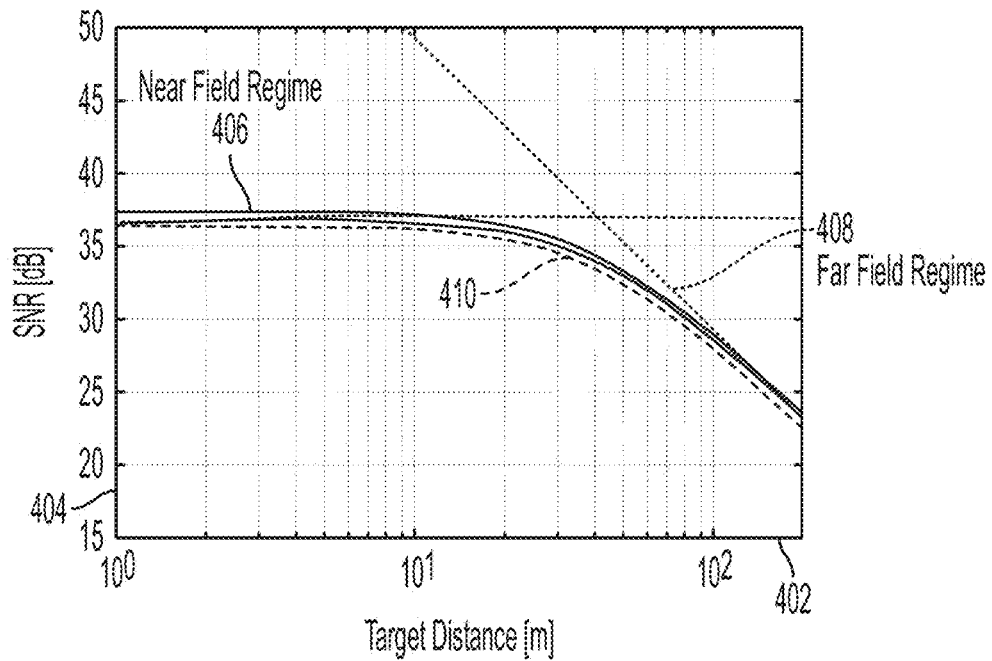
FIG. 4A is a graph that illustrates an example signal-to-noise ratio (SNR) versus target range for the transmitted signal in the system of FIG. 2D without scanning, according to an embodiment.
Figure 4B:
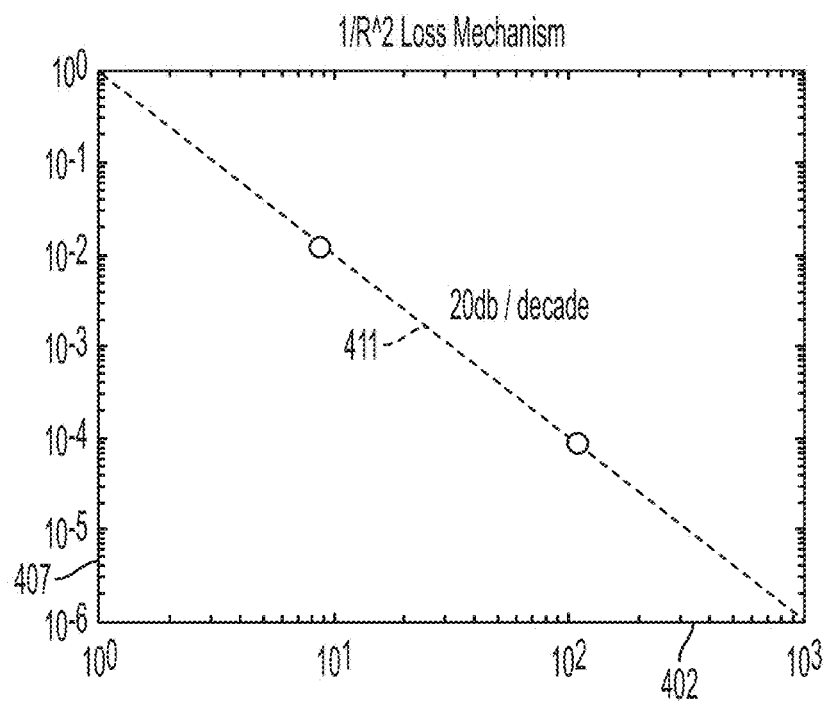
FIG. 4B is a graph that illustrates an example of a trace indicating a 1/r-squared loss that drives the shape of the SNR trace of FIG. 4A in the far field, according to an embodiment.
Figure 4C:
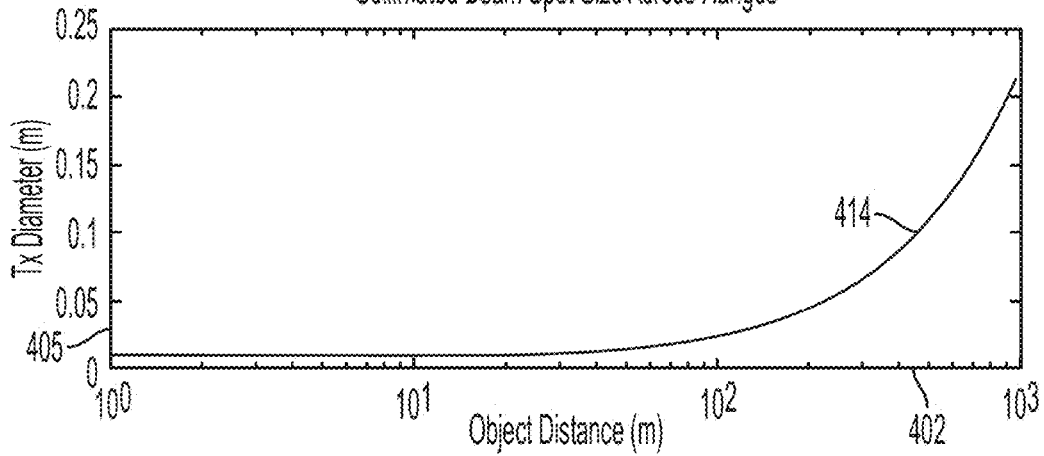
FIG. 4C is a graph that illustrates an example of collimated beam diameter versus range for the transmitted signal in the system of FIG. 2D without scanning, according to an embodiment.
Figure 4D:
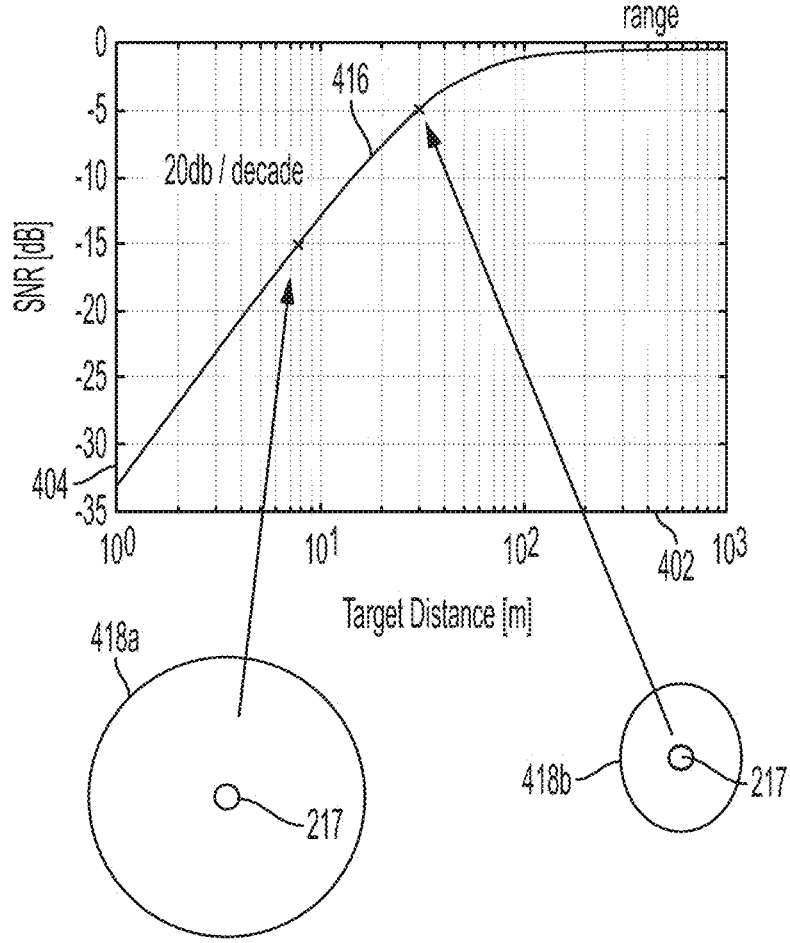
FIG. 4D is a graph that illustrates an example of SNR associated with collection efficiency versus range for the transmitted signal in the system of FIG. 2D without scanning, according to an embodiment.
Figure 4E:
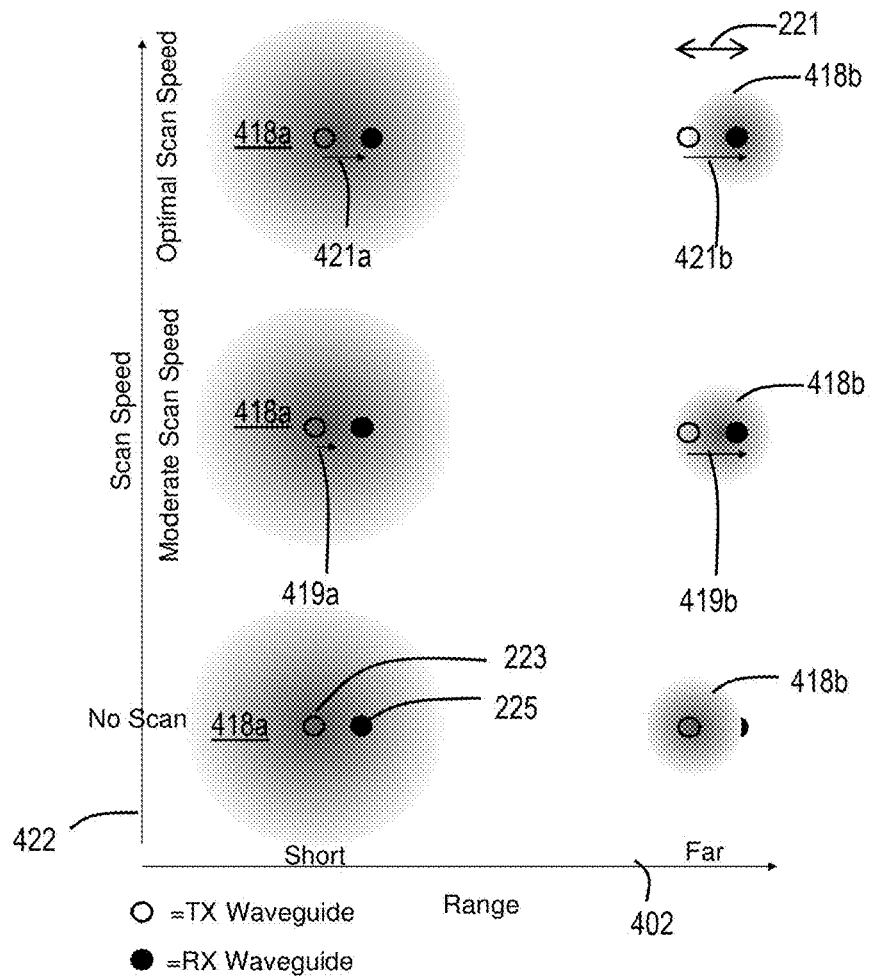
FIG. 4E is an image that illustrates an example of beam walkoff for various target ranges and scan speeds in the system of FIG. 2E, according to an embodiment.
Figure 4F:
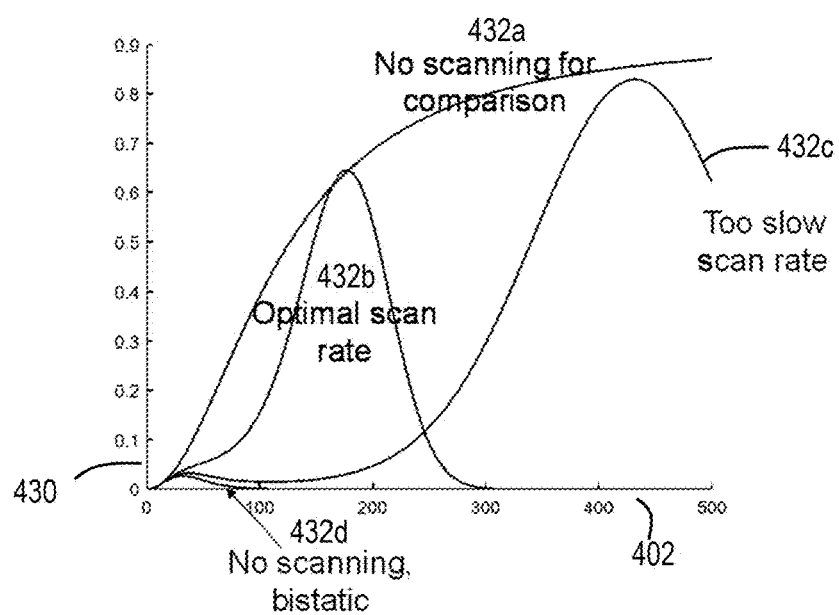
FIG. 4F is a graph that illustrates an example of coupling efficiency versus target range for various scan rates in the system of FIG. 2E, according to an embodiment.
Figure 4G:
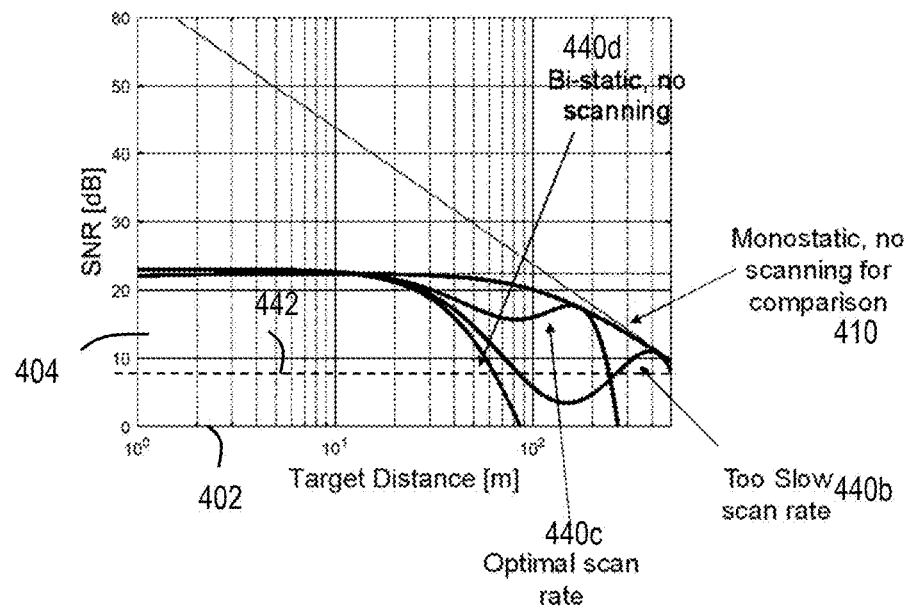
FIG. 4G is a graph that illustrates an example of SNR versus target range for various scan rates in the system of FIG. 2E, according to an embodiment.
Figure 4H:
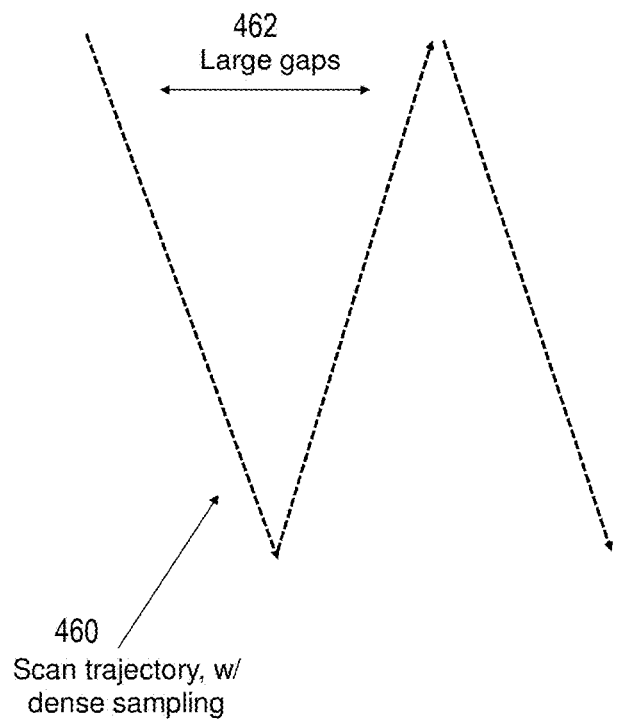
FIG. 4H is a graph that illustrates an example of a conventional scan trajectory of the beam in the system of FIG. 2E mounted on a moving vehicle, according to an embodiment.
Figure 4I:
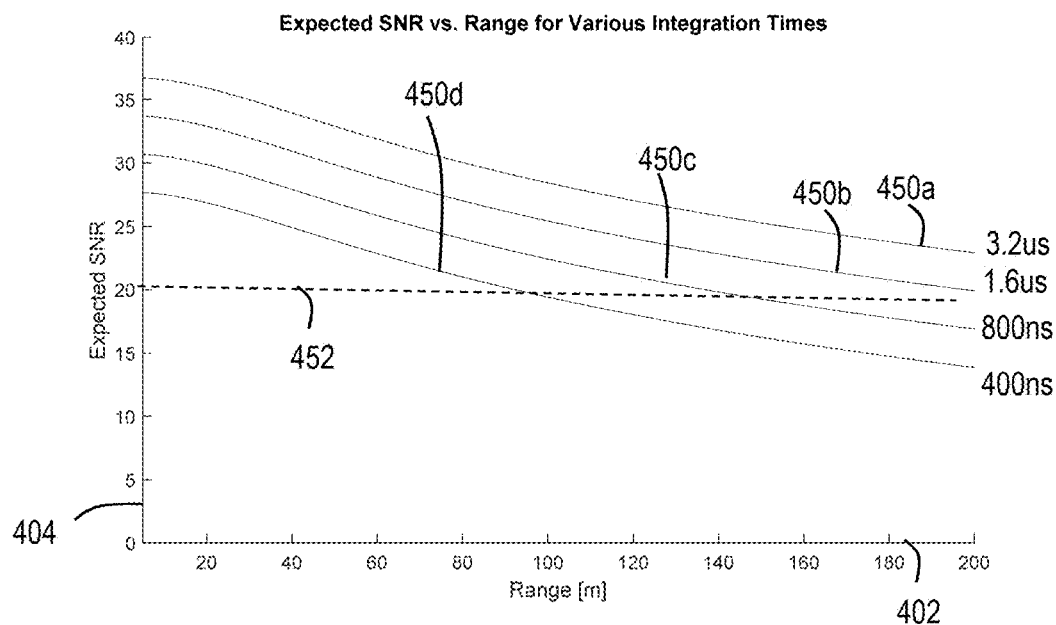
FIG. 4I is a graph that illustrates an example of SNR versus target range for various integration times in the system of FIG. 2E, according to an embodiment.
Figure 4J:
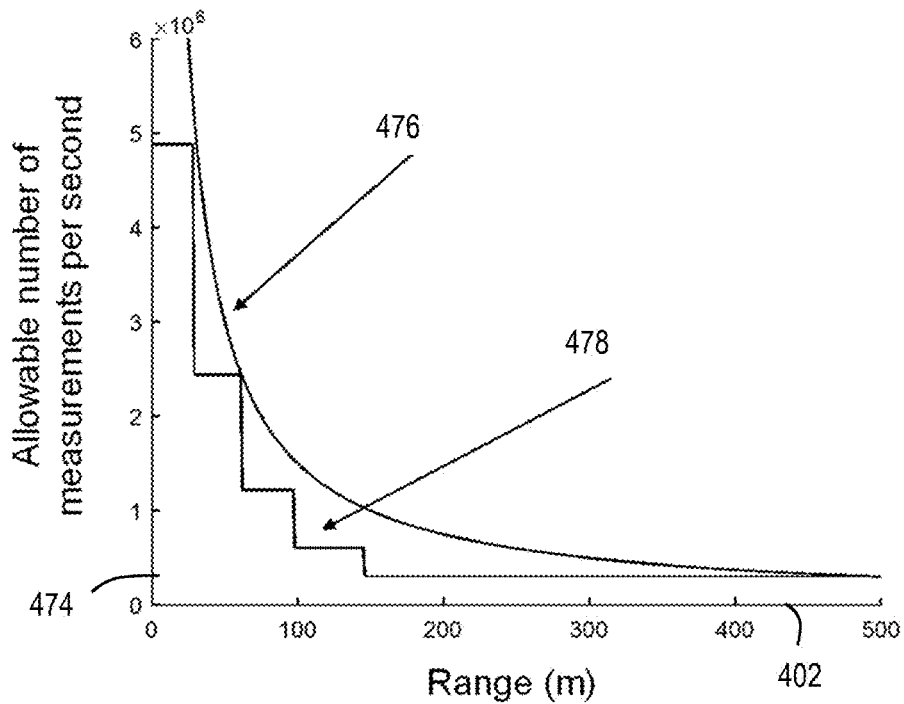
FIG. 4J is a graph that illustrates an example of a measurement rate versus target range in the system of FIG. 2E, according to an embodiment.
Figure 4K:
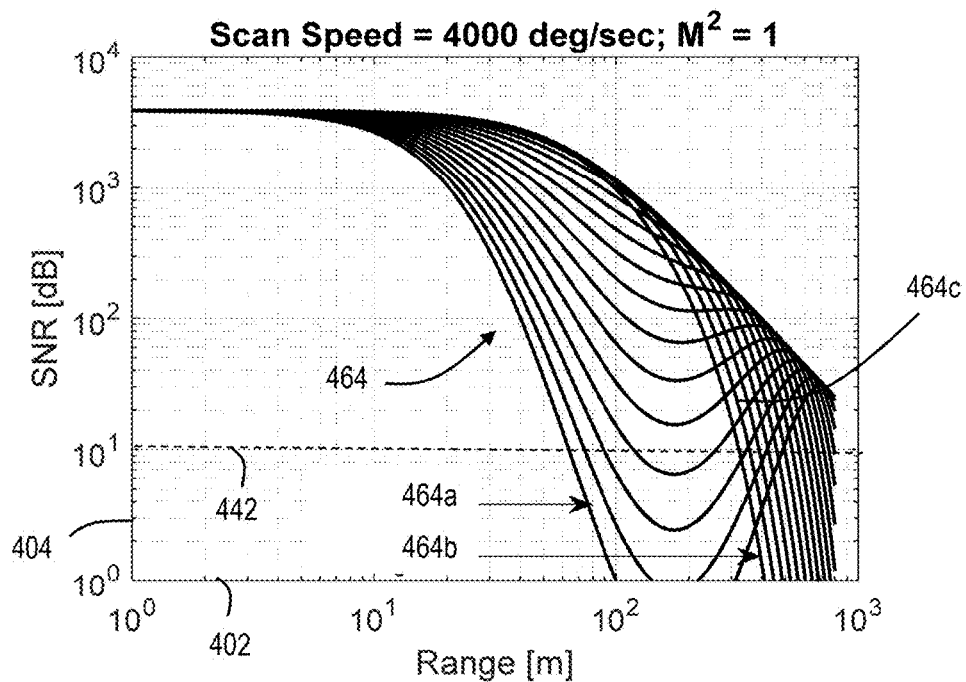
FIG. 4K is a graph that illustrates an example of SNR versus target range for various separation values in the system of FIG. 2E, according to an embodiment.
Figure 4L:
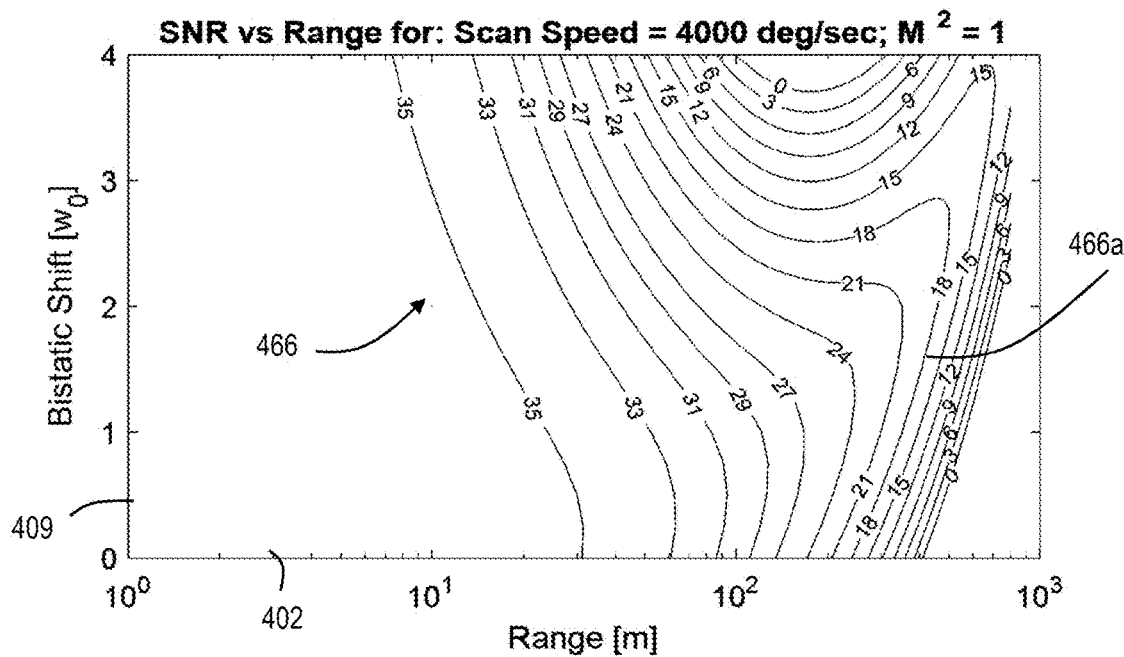
FIG. 4L is a graph that illustrates an example of separation versus target range for various SNR values in the system of FIG. 2E, according to an embodiment.
Figure 4M:
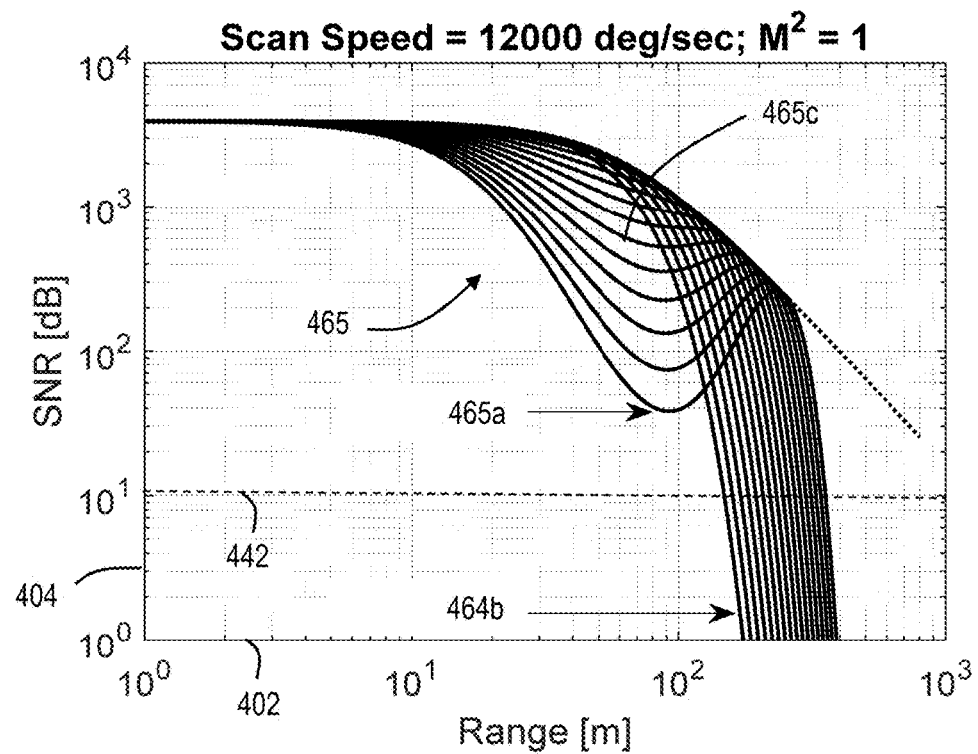
FIG. 4M is a graph that illustrates an example of SNR versus target range for various separation values in the system of FIG. 2E, according to an embodiment.

FIG. 4M is a graph that is similar to the graph of FIG. 4K but is for a high fixed scan speed (e.g. 12000 deg/sec). First trace 465a is similar to first trace 464a and is for a separation 221 of 4 $w_o$. Second trace 465b is similar to second trace 464b and is for a separation 221 of 0 (e.g. 0 $w_o$). Using the same target design range (e.g. 0 m-250 m), trace 465c is selected since it has SNR values above the SNR threshold 442 over the target design range. The separation 221 value associated with trace 465c is 2.75 $w_o$ and hence the separation 221 in the system 200" is set at 2.75 $w_o$ if the polygon scanner 244 is operated at the high fixed scan speed (e.g. 12000 deg/sec). Thus, when designing the system 200" a user can first determine the target design range (e.g. 0 m-250 m) over the range of angles and then use FIG. 4M to quickly determine which of the traces 465 maintains an SNR above the SNR threshold 442 over that target design range and the fixed scan speed of the polygon scanner 244. That trace can be used to design the hardware to provide the desired separation 221 between transmission waveguide 223 and receiving waveguide 225.

Figure 4N:
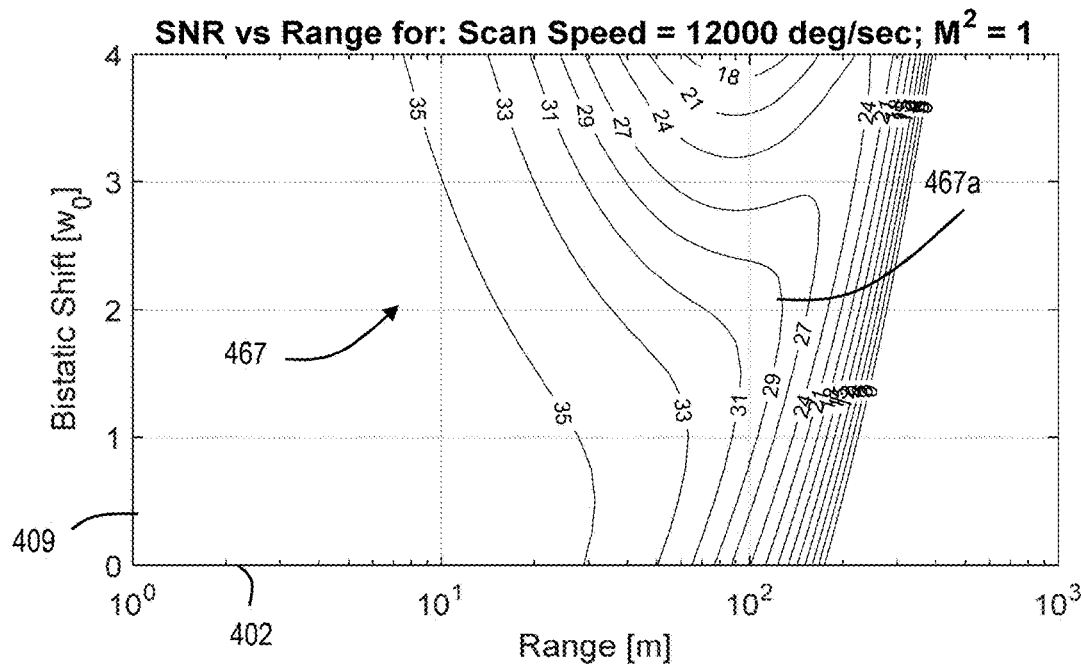
FIG. 4N is a graph that illustrates an example of separation versus target range for various SNR values in the system of FIG. 2E, according to an embodiment.

FIG. 4N is a graph that depicts a plurality of SNR traces 467 for the system 200" with the high fixed scan speed (e.g. 12000 deg/sec). For a specific design target range (e.g. 100 m) along the horizontal axis 402, the SNR traces 467 communicate a value of the separation 221 (along the vertical axis 409) that is able to maintain an SNR level associated with the trace 467. In an example embodiment, for the design target range of 100 m, trace 467a indicates that an SNR of 28 dB can be maintained at multiple values of the separation 221 (e.g. about 0.75 $w_o$ and about 2.25 $w_o$). In addition to FIG. 4M, the traces 467 provide a quick look up means for a user when designing a system 200" based on a known design target range and fixed scan speed. In an embodiment, as with the traces 465 of FIG. 4M, the traces 467 are generated using the system 200" by measuring the SNR of the return beam 291' at multiple separation 221 values across multiple target range values. Additionally, the traces 467 are not limited to those depicted in FIG. 4N.

Figure 4O:
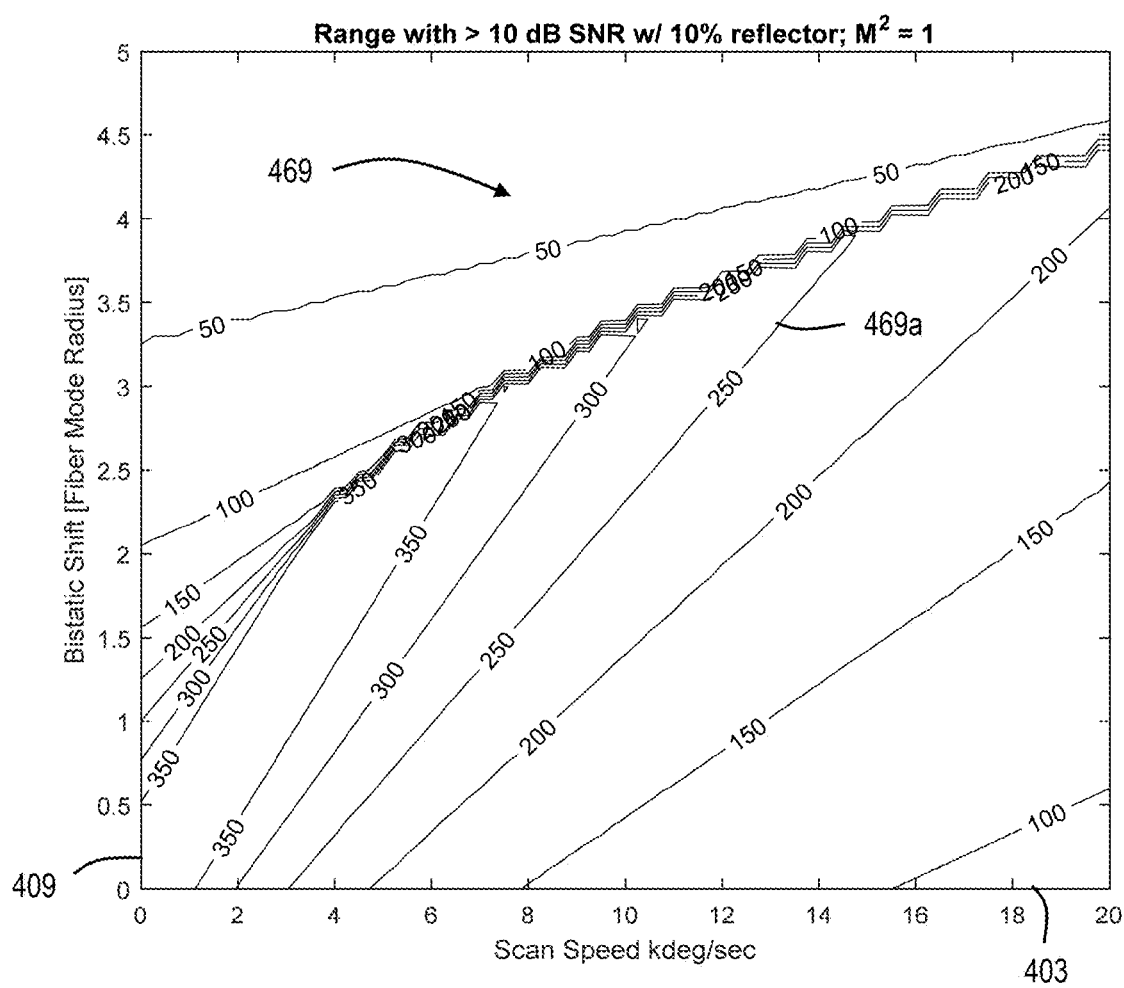
FIG. 4O is a graph that illustrates an example of separation versus scan speed for various target range values with minimum threshold SNR in the system of FIG. 2E, according to an embodiment.

FIG. 4O is a graph that illustrates an example of separation versus scan speed for various target range values with minimum threshold SNR in the system of FIG. 2E, according to an embodiment. The horizontal axis 403 is scan speed in units of kilodegrees per second. The vertical axis 409 is the separation 221 in units of $w_o$ (e.g., fiber mode radius) At a particular scan speed along the horizontal axis 403, the traces 469 provide the value of the separation 221 to maintain the SNR threshold 442 (e.g. 10 dB) across a design target range value associated with the trace 469. In an example embodiment, for the scan speed of 12,000 deg/second, trace 469a indicates a separation 221 value of about 2.75 $w_o$ to maintain the SNR threshold 442 for a design target range of 250 m. This is consistent with the example embodiment of trace 465c of FIG. 4M. Additionally, in an example embodiment, for the scan speed of 4,000 deg/second, trace 469a indicates a separation 221 value of about 0.25 $w_o$ to maintain the SNR threshold 442 for a design target range of 250 m. This is consistent with the example embodiment of trace 464c of FIG. 4K. Thus, FIG. 4O provides an additional advantageous look up graph that is useful during the design and fabrication of the system 200".

In an embodiment, the receiving waveguide 225a has a separation 221a that is about 2-5 times the diameter $w_o$ of the transmission waveguide 223 and is used to receive return beams 291' from the target positioned at a further range (e.g. greater than about 50 m). For a target positioned at a further range, the round trip time is longer, the facet 245a rotates a greater extent than depicted in FIG. 2F and hence the return beam 291' is deflected by a greater angle 228 to the collimation optic 229. However, for a target positioned at a further range, a diameter of the image 418 (FIG. 4E) of the return beam 291' on the bistatic transceiver 215 is smaller and thus the separation 221a is smaller in magnitude and in range (e.g. increased precision) in order to ensure that the image 418 is shifted by the appropriate separation 221a to the receiving waveguide 225a. In one embodiment, the separation 221 is based on a ratio (e.g. less than one) of the diameter of the image 418.

In an embodiment, the receiving waveguide 225b has a separation 221b that is about 5-10 times the diameter $w_o$ of the transmission waveguide 223 and is used to receive return beams 291' from the target positioned at a smaller range (e.g. less than about 50 m). For a target positioned at a smaller range, the round trip time is shorter, the facet 245a rotates a lesser extent than depicted in FIG. 2F and hence the return beam 291' is deflected by a lesser angle 228 to the collimation optic 229. However, for a target positioned at a smaller range, a diameter of the image 418 (FIG. 4E) of the return beam 291' on the bistatic transceiver 215 is larger and thus the separation 221b is larger in magnitude and in range (e.g. reduced precision) since there is wider latitude on whether the larger image 418 be shifted a particular amount in order to achieve a minimum SNR in the receiving waveguide 225b.

Thus, in an embodiment, the receiving waveguides 225a, 225b can be used to receive return beams 291' from targets at different ranges as the beam 205" is scanned over the angle range 227 at a fixed rotation speed. In an example embodiment, the waveguide 225a receives return beams 291' from targets positioned at a longer range over a first portion of the angle range 227 and the waveguide 225b receives return beams 291' from targets positioned at a shorter range over a second portion of the angle range 227. However, in other embodiments, only one receiving waveguide 225a or 225b is used to receive return beams 291' from targets within one value or within a range of values of the target range as the beam 205" is scanned over the angle range 227 (e.g. from about 0 m to about 250 m).

In an embodiment, the system 200" excludes the circulator 226 because the return is not on the same path as the transmitted beam; and hence the receiving waveguide 225a is provided along the offset receive path 224 and connected to the optical mixer 284. The reference beam 207b is transmitted in a waveguide along the LO path 220 so that the reference beam 207b is combined with the return beam 291' from the receiving waveguide 225a in the optical mixer 284. In an embodiment, where multiple receiving waveguides 225a, 225b are provided tuned for multiple different ranges, a similar arrangement is provided for the receiving waveguide 225b so that the receiving waveguide 225b is provided along the receive path 224 and connected to a respective optical mixer 284 where a respective reference beam 207b is combined with the return beam 291' from the receiving waveguide 225b. In one embodiment, where one receiving waveguide 225a is in the bistatic transceiver 215, only one processing channel (e.g. one receiving waveguide, one optical mixer, one waveguide along the LO path) is provided. In another embodiment, where multiple receiving waveguides 225a, 225b are provided, multiple processing channels are provided. Thus the system 200" includes an equivalent number of processing channels as the number of receiving waveguides 225.

In an embodiment, the acquisition system 240 and/or processing system 250 is configured to process the return beam 291' at sequential time periods from the receiving waveguides 225 (e.g. process return beam 291' from receiving waveguide 225a over a first time period, process return beam 291' from receiving waveguide 225b over a second time period) since the return beams 291' are sequentially received at non-overlapping time periods from the receiving waveguides 225a, 225b.

4. Coherent LIDAR System Parameters

In an embodiment, monostatic coherent LIDAR performance of the system 200' is modeled by including system parameters in a so called "link budget". A link budget estimates the expected value of the signal to noise ratio (SNR) for various system and target parameters. In one embodiment, on the system side, a link budget includes one or more of output optical power, integration time, detector characteristics, insertion losses in waveguide connections, mode overlap between the imaged spot and the monostatic collection waveguide, and optical transceiver characteristics. In another embodiment, on the target side, a link budget includes one or more of atmospheric characteristics, target reflectivity, and target range.

FIG. 4A is a graph that illustrates an example signal-to-noise ratio (SNR) versus target range for the return beam 291 in the system 200' of FIG. 2D without scanning, according to an embodiment. In other embodiments, FIG. 4A depicts an example of SNR versus target range for the return beam 291 in the system 200 of FIG. 2A. The horizontal axis 402 is target range in units of meters (m). The vertical axis 404 is SNR in units of decibels (dB). A trace 410 depicts the values of SNR versus range that is divided into a near field 406 and a far field 408 with a transition from the near field 406 of the trace 410 with a relatively flat slope to the far field 408 of the trace 410 with a negative slope (e.g. about −20 dB per 10 m). The reduction in SNR in the far field 408 is dominated by "r-squared" losses, since the scattering atmosphere through which the return beam 291 passes grows with the square of the range to the target while the surface area of the optical waveguide tip 217 to collect the return beam 291 is fixed. FIG. 4B is a graph that illustrates an example of a trace 411 indicating 1/r-squared loss that drives the shape of the SNR trace 410 in the far field 408, according to an embodiment. The horizontal axis 402 is range in units of meters (m) and the vertical axis 407 is power loss that is unitless.

In the near field 406, a primary driver of the SNR is a diameter of the collimated return beam 291 before it is focused by the collimation optics 229 to the tip 217. FIG. 4C is a graph that illustrates an example of collimated beam diameter versus range for the return beam 291 in the system 200' of FIG. 2D without scanning, according to an embodiment. The horizontal axis 402 is target range in units of meters (m) and the vertical axis 405 is diameter of the return beam 291 in units of meters (m). In an embodiment, trace 414 depicts the diameter of the collimated return beam 291 incident on the collimation optics 229 prior to the return beam 291 being focused to the tip 217 of the optical waveguide. The trace 414 illustrates that the diameter of the collimated return beam 291 incident on the collimation optics 229 increases with increasing target range.

In an embodiment, in the near field 406, as the diameter of the collimated return beam 291 grows at larger target ranges, a diameter of the focused return beam 291 by the collimation optics 229 at the tip 217 shrinks. FIG. 4D is a graph that illustrates an example of SNR associated with collection efficiency of the return beam 291 at the tip 217 versus range for the transmitted signal in the system of FIG. 2D without scanning, according to an embodiment. The horizontal axis 402 is target range in units of meters (m) and the vertical axis 404 is SNR in units of decibels (dB). The trace 416 depicts the near field SNR of the focused return beam 291 by the collimation optics 229 at the tip 217 based on target range. At close ranges within the near field 406, an image 418a of the focused return beam 291 at the tip 217 by the collimation optics 229 is sufficiently larger than the core size of the single mode optical fiber tip 217. Thus, the SNR associated with the collection efficiency is relatively low. At longer ranges within the near field 406, an image 418b of the focused return beam 291 at the tip 217 by the collimation optics 229 is much smaller than the image 418a and thus the SNR attributable to the collection efficiency increases at longer ranges. In an embodiment, the trace 416 demonstrates that the SNR in near field 406 has a positive slope (e.g. +20 dB per 10 meters) based on the improved collection efficiency of the focused return beam 291 at longer ranges. In one embodiment, this positive slope in the near field SNR cancels the negative slope in the near field SNR discussed in FIG. 4B that is attributable to "r-squared" losses and thus leads to the relatively flat region of the SNR trace 410 in the near field 406. The positive slope in the SNR trace 416 in FIG. 4D does not extend into the far field 408 and thus the "r-squared" losses of FIG. 4B dominate the far field 408 SNR as depicted in the SNR trace 410 in the far field 408.

While the discussion in relation to FIGS. 4A-4D predicts SNR of the return beam 291 as a function of the target range, the predicted SNR in FIGS. 4A-4D is for a monostatic coherent LIDAR system 200' and does not fully characterize the performance of the scanned monostatic coherent LIDAR system 200' since it does not consider a scan rate of the scanning optics 218 or the offset of the returned beam depicted in FIG. 2E. FIGS. 4E-4G below are discussed in the context of the bistatic coherent LIDAR system 200" where the beam 205" is scanned at a scan rate that is greater than zero. In an embodiment, due to round trip delay of the return beam 291', the receive mode of the return beam 291' will laterally shift or "walk off" from the transmission waveguide of the transmitted beam 205' when the beam is being scanned by the scanning optics 218 (e.g. polygon scanner 244). In an embodiment, the return beam 291' is deflected at the angle 228 relative to the transmitted beam 205' and the collimation optic 229 focuses the return beam 291' into the tip 217 of the receiving waveguide 225a if the lateral shift or "walk off" corresponds to the separation 221a or is within a threshold of the separation 221a. In an embodiment, the threshold is a maximum ratio of a diameter of an image of the return beam 291' on the tip 217 of the receiving waveguide 225 (e.g. ratio less than 1). In one embodiment, the walkoff is advantageously such that the overlap of the image 418 of the return beam 291' with the receiving waveguide 225 leads to optimal collection efficiency, e.g. the walkoff is such that the center of the image 418 is within ±10% of the tip 217 of the receiving waveguide 225.

FIG. 4E is an image that illustrates an example of beam walkoff for various target ranges and scan speeds in the system 200" of FIG. 2E, according to an embodiment. The horizontal axis 402 is target range and the vertical axis 422 is scan speed of the beam using the scanning optics 218. As FIG. 4E depicts, there is no beam walkoff when the beam is not scanned (bottom row) since the image 418a of the focused return beam 291' is centered on the tip 217 of the transmission waveguide 223 demonstrating no beam walkoff at short target range and the image 418b of the focused return beam 291' is also centered on the tip 217 of the transmission waveguide 223 demonstrating no beam walkoff at far target range. In an embodiment, since the beam 291' is not centered on or near the tip 217 of the receiving waveguide 225 and/or there is little or no beam walkoff and thus the beam walkoff is not within a threshold of the separation 221 between the transmission waveguide 223 and the receiving waveguide 225. Consequently, this is not an optimal arrangement for the bistatic transceiver system 200". As depicted in FIG. 4E, a diameter of the image 418a is greater than the separation 221 and thus the image 418a of the return beam 291' partially overlaps with the tip 217 of the receiving waveguide 225. Consequently, some portion of the return beam 291' is received in the tip 217 of the receiving waveguide 225 at the shorter target range and thus the signal to noise ratio (SNR) is greater than zero, even when the beam 205" is not scanned. Additionally, as depicted in FIG. 4E, a diameter of the image 418b is less than or about equal to the separation 221 and thus the image 418b of the return beam 291' may not overlap with the tip 217 of the receiving waveguide 225 for longer target range. As a result, little or no portion of the return beam 291' is received in the tip of the receiving waveguide 225 at longer target range when the beam 205" is not scanned.

When the beam 205" is scanned at a moderate scan speed (middle row in FIG. 4E), a moderate beam walkoff 419a is observed between the image 418a of the focused return beam 291' and the tip 217 of the transmission waveguide 223 for small target range and a larger beam walkoff 419b is observed between the image 418b of the focused return beam 291' and the tip 217 of the transmission waveguide 223 for far target range. Although the beam walkoff 419b is greater for the larger target range than the beam walkoff 419a for the smaller target range, the return beam 291' has higher SNR at smaller target range due to the much larger diameter of the image 418a on the receiving waveguide 225. Since the walkoff 419b is less than a ratio of a diameter of the image 418b, this is not optimal arrangement for the bistatic transceiver system 200" for far target range. However, in some embodiments, the spacing 221 is selected based on the walkoff 419a so that the receiving waveguide 225a is configured to receive the return beam 291' at the short range when the polygon scanner 244 is rotating at the moderate scan speed, since the increased diameter of the image 418a for short target range may result in the SNR of the return beam 291' being greater than a SNR threshold, despite the small walkoff 419a.

When the beam 205" is scanned at a high scan speed (top row in FIG. 4E), a beam walkoff 421a is observed at short range that exceeds the beam walkoff 419a at the moderate scan speed and a beam walkoff 421b is observed at large range that exceeds the beam walk off 419b at the moderate scan speed. Thus, the beam walkoff increases as the target range and scan speed increase. In an embodiment, increased target range induces a time delay during which the image 418a, 418b shifts away from the tip 217 of the transmission waveguide 223. Thus, a model of the mode overlap accounts this walkoff appropriately. In one embodiment, such a model should limit the beam walkoff 419, 421 based on a diameter of the image 418 (e.g. no greater than half of the diameter of the image 418) and thus for the target 418a at smaller target range there is wider latitude for the acceptable range of the beam walkoff 419, 421. In one embodiment, the spacing 221b is adjusted based on the beam walkoff 421a and the spacing 221a is adjusted based on the beam walkoff 421b so that the polygon scanner 244 can be set at a fixed optimal scan speed and so that return beams 291' from a target at a shorter range is deflected into the receiving waveguide 225b and return beams 291' from a target at a longer range is deflected into the receiving waveguide 225a. In this example embodiment, the beam walkoff 421a is within the threshold of the spacing 221a and the beam walkoff 421b is within the threshold of the spacing 221b.

FIG. 4F is a graph that illustrates an example of coupling efficiency versus target range for various scan rates in the system 200" of FIG. 2E, according to an embodiment. The horizontal axis 402 is target range in units of meters (m) and the vertical axis 430 is coupling efficiency which is unitless. In an embodiment, the coupling efficiency is inversely proportional to the difference between the separation 221 and the beam walkoff 419, 421 and/or the diameter of the image 418 (e.g. for larger diameter, wider latitude in the difference between the separation 221 and beam walkoff 419, 421 and for smaller diameter, narrower latitude in the difference). A first trace 432a depicts the coupling efficiency of the focused return beam 291 into the fiber tip 217 in the monostatic system 200' for various target ranges based on no scanning of the beam 205'. The coupling efficiency remains relatively high and constant for a wide range of target ranges. A second trace 432c depicts the coupling efficiency of the focused return beam 291' into the tip 217 of the receiving waveguide 225 for various target ranges based on moderate scan rate of the beam. In an embodiment, the coupling efficiency at the moderate scan rate peaks at a high target range (e.g. about 450 m) and then decreases for target ranges above and below this high target range. A third trace 432b depicts the coupling efficiency of the focused return beam 291' into the tip 217 of the receiving waveguide 225 for various target ranges based on a high scan rate of the beam. In an embodiment, the coupling efficiency of the high scan rate peaks at a moderate target range (e.g. about 180 m) and then decreases as target range increases. A fourth trace 432d depicts the coupling efficiency of the focused return beam 291' into the tip 217 of the receiving waveguide 225 for various target ranges based on no scanning of the beam. Since no scanning of the beam results in the return beam 291' being centered on the transmission waveguide 223 (bottom row of FIG. 4E), the coupling efficiency is about 0 throughout the target range. Consequently, no scanning of the beam 205" is not an advantageous mode of operation for the bistatic LIDAR system 200".

Based on the traces in FIG. 4F, no scanning results in little to no coupling efficiency into the receiving waveguides 225 and thus is not optimal for the bistatic LIDAR system 200". Also, scanning too slow makes it impossible to see within a wide target range (e.g. <300 m). In this instance, the beam walkoff 419b of the image 418b of the focused return beam 291' only approaches the separation 221 at very large target range (e.g. beyond 300 m). Consequently, it is not optimal to operate the bistatic LIDAR system 200" at the slow scan speed, at least to capture return beam 291' data for targets having a range shorter than this very large range (e.g. for targets with range <300 m). FIG. 4F also depicts that scanning at an optimal speed (e.g. trace 432b) makes it possible to see targets positioned in a wide target range (e.g. from about 100 m to about 300 m). This is based on the beam walkoff 421b being within the threshold of the separation 221. In an example embodiment, the moderate scan speed is in a range from about 1000 deg/sec to about 2000 deg/sec and the optimal scan speed is in a range from about 4000 deg/sec to about 7000 deg/sec.

FIG. 4G is a graph that illustrates an example of SNR versus target range for various scan rates in the system 200" of FIG. 2E, according to an embodiment. The horizontal axis 402 is target range in units of meters (m) and the vertical axis 404 is SNR in units of decibels (dB). A first trace 440d depicts the SNR of the focused return beam 291' on the tip 217 of the receiving waveguide 225 based on target range where the beam is not scanned. Although there is no beam walkoff when the beam is not scanned, the image 418a of the focused return beam 291' partially overlaps with the tip 217 of the receiving waveguide 225 (bottom row of FIG. 4E), and hence the SNR is greater than zero and may be greater than the SNR threshold 442 since the diameter of the image 418a is relatively large. Additionally, when the beam is not scanned (bottom row of FIG. 4E) for large target range the diameter of the image 418b of the focused return beam 291' is much smaller than at smaller target range and fails to overlap with the tip 217 of the receiving waveguide 225. Hence, beyond some target range (e.g. about 90 m) the SNR of the trace 440d approaches zero.

A second trace 440b depicts the SNR of the focused return beam 291' on the tip 217 of the receiving waveguide 225 based on target range where the beam is scanned at a slow scan rate. In an example embodiment, the slow scan rate is about 2500 degrees per sec (deg/sec) or in a range from about 1000 deg/sec to about 4000 deg/sec or in a range from about 500 deg/sec to about 5000 deg/sec. A third trace 440c depicts the SNR of the focused return beam 291' on the tip 217 of the receiving waveguide 225 based on target range where the beam is scanned at an optimal scan rate. In an example embodiment, the optimal scan rate is about 5500 deg/sec or in a range from about 4000 deg/sec to about 7000 deg/sec or in a range from about 3000 deg/sec to about 8000 deg/sec. In an embodiment, the slow scan rate and optimal scan rate are based on one or more parameters of the system 200" including a beam size and/or the separation 221 and/or a goal of the system 200". In an example embodiment, the numerical ranges of the slow scan rate and optimal scan rate above are based on a collimated beam with a diameter of about 1 centimeter (cm) used to scan an image out to a maximum target range of about 400 meters (m).

Ultimately, a difference between the beam walk off 419, 421 and the separation 221 is a significant inhibitor of SNR in coherent bistatic LIDAR system 200" and/or a diameter of the image 418 for a particular target range indicates a tolerance or precision of the difference in order to achieve a threshold SNR. In an embodiment, the scan rate of the beam in the bistatic system 200" is set at a fixed scan rate (e.g. fixed speed of the angular velocity 249 of the polygon scanner 244) over the angle range and the resulting target range, where the fixed scan rate is chosen so that the associated SNR of the fixed scan rate is above an SNR threshold over the target range. In conventional coherent LIDAR systems, this results in a relatively low fixed scan rate being used to scan the beam over a scan trajectory 460, which results in large gaps 462 between adjacent scans, as depicted in FIG. 4H. The scan speed limitation leads to dense sampling along the beam trajectory 460. When the beam is scanned over a reasonably large field of few (e.g. 10's of degrees in either dimension), the beam trajectory 460 leaves large gaps 462 in the angular coverage. This is not ideal as targets positioned in the large gaps 462 go undetected. A "square grid" of rectangular sampling is not achieved. Instead, an asymmetry is observed between the sampling along the scan trajectory 460 and the gaps 462 between the trajectory 460 which can be greater than 10:1. With this problem in mind, several complementary solutions are presented here, including one or more of maximizing the fixed beam scan speed and generate efficient hardware solutions (e.g. polygon scanner 244) for these concepts.

In addition to the scan rate of the beam, the SNR of the return beam 291' is affected by the integration time over which the acquisition system 240 and/or processing system 250 samples and processes the return beam 291'. In some embodiments, the beam is scanned between discrete angles and is held stationary or almost stationary at discrete angles in the angle range 227 for a respective integration time at each discrete angle. In other embodiments, the beam is scanned at a fixed scan rate (e.g. using the polygon scanner 244) throughout the angle range 227. The SNR of the return beam 291' is affected by the value of the integration time and/or the target range and/or the scan rate and/or the separation 221. As previously discussed, the cross-sectional area of the beam increases with target range resulting in increased atmospheric scattering and thus an intensity of the return beam 291' decreases with increasing range. Accordingly, a longer integration time is needed to achieve the same SNR for a return beam 291' from a longer target range.

FIG. 4I is a graph that illustrates an example of SNR versus target range for various integration times in the system 200" of FIG. 2E, according to an embodiment. The horizontal axis 402 is target range in units of meters (m) and the vertical axis 404 is SNR in units of decibels (dB). A first trace 450a depicts SNR values of the return beam 291' over the target range, where the system 200" is set to a first integration time (e.g. 3.2 μs). A second trace 450b depicts SNR values of the return beam 291' over the target range, where the system 200" is set to a second integration time (e.g. 1.6 μs). A third trace 450c depicts SNR values of the return beam 291' over the target range, where the system 200" is set to a third integration time (e.g. 800 ns). A fourth trace 450d depicts SNR values of the return beam 291' over the target range, where the system 200" is set to a fourth integration time (e.g. 400 ns). The traces 450 demonstrate that for a fixed target range, an increased SNR is achieved with increasing integration time. The traces 450 also demonstrate that for a fixed integration time, the SNR of the return beam 291' decreases with increased range for the reasons previously discussed. In one embodiment, the a fixed integration time is selected (e.g. 1.6 μs) for the scanning at the range of angles 227 and resulting target ranges, so that the SNR associated with the fixed integration time exceeds an SNR threshold 452 over the target range.

Another embodiment involves minimizing the integration time at each angle within the range of angles 227 using the target range at each angle, so to minimize the integration time over the range of angles 227. FIG. 4J is a graph that illustrates an example of a measurement rate versus target range in the system 200" of FIG. 2E, according to an embodiment. The horizontal axis 402 is target range in units of meters (m) and the vertical axis 474 is number of allowable measurements per unit time in units of millions of allowable measurements per second. Trace 476 depicts the number of allowable measurements per second at each target range. In an embodiment, trace 476 represents an inverse of the integration time, e.g. the number of return beams 291' that can be detected at each target range per second whereas integration time conveys how long it takes to process the return beam 291' at each target range. Trace 478 is also provided and is a good target of the number of allowable measurements per second at each target range. The trace 478 is based on power of 2 intervals for a given ADC (analog to digital conversion) rate. Trace 478 represents a good target of the number of allowable measurements per second since when the number of digitized samples is a power of 2, the fast Fourier transform on such a length signal is more efficient. The traces 450 change based on one or more system 200" system parameters including but not limited to the waveguide separation 221, the power of the transmitted signal 205' and the focal length of the collimation optic 229.

5. Vehicle Control Overview

In some embodiments a vehicle is controlled at least in part based on data received from a hi-res Doppler LIDAR system mounted on the vehicle.

Figure 3A:
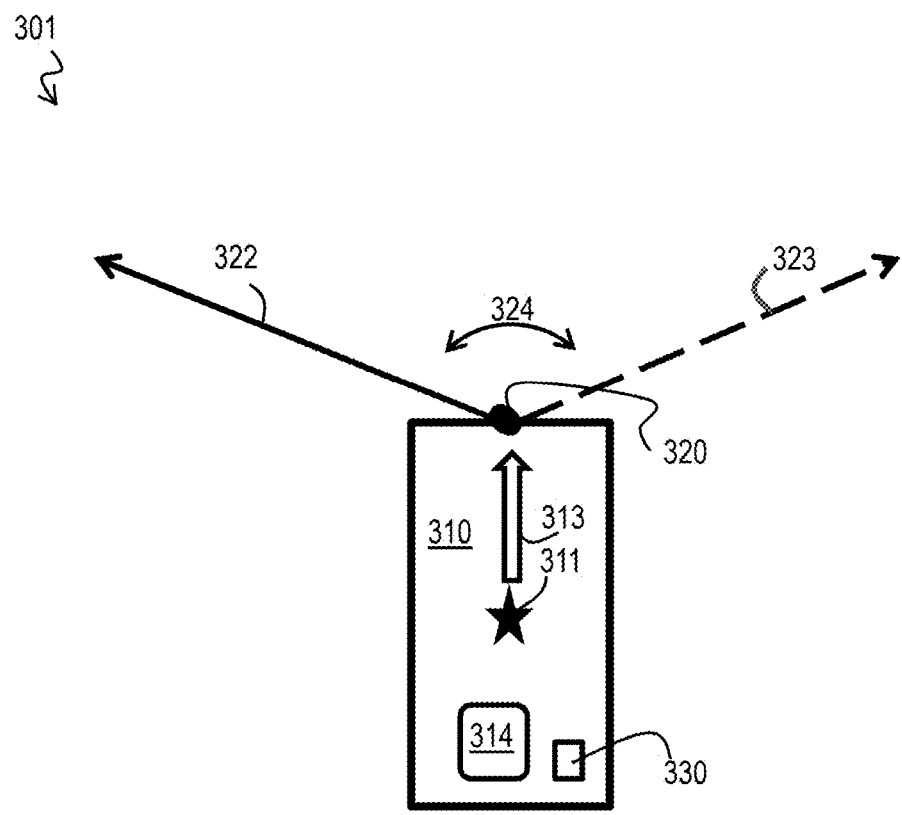
FIG. 3A is a block diagram that illustrates an example system that includes at least one hi-res LIDAR system mounted on a vehicle, according to an embodiment.

FIG. 3A is a block diagram that illustrates an example system 301 that includes at least one hi-res Doppler LIDAR system 320 mounted on a vehicle 310, according to an embodiment. In an embodiment, the LIDAR system 320 is similar to one of the LIDAR systems 200, 200', 200". The vehicle has a center of mass indicted by a star 311 and travels in a forward direction given by arrow 313. In some embodiments, the vehicle 310 includes a component, such as a steering or braking system (not shown), operated in response to a signal from a processor, such as the vehicle control module 272 of the processing system 250. In some embodiments the vehicle has an on-board processor 314, such as chip set depicted in FIG. 8. In some embodiments, the on-board processor 314 is in wired or wireless communication with a remote processor, as depicted in FIG. 7. In an embodiment, the processing system 250 of the LIDAR system is communicatively coupled with the on-board processor 314 or the processing system 250 of the LIDAR is used to perform the operations of the on board processor 314 so that the vehicle control module 272 causes the processing system 250 to transmit one or more signals to the steering or braking system of the vehicle to control the direction and speed of the vehicle. The hi-res Doppler LIDAR uses a scanning beam 322 that sweeps from one side to another side, represented by future beam 323, through an azimuthal field of view 324, as well as through vertical angles (FIG. 3B) illuminating spots in the surroundings of vehicle 310. In some embodiments, the field of view is 360 degrees of azimuth. In some embodiments the inclination angle field of view is from about +10 degrees to about −10 degrees or a subset thereof. In some embodiments, where the system 320 is the system 200", the field of view 324 is defined by the range of angles 227. In designing the system 301, a predetermined maximum design range of the beams at each angle over the field of view 324 is determined and represents a maximum anticipated target range at each angle in the range field of view 324. In an example embodiment, the maximum design range is a fixed value or a fixed range of values over the field of view 324. In an example embodiment, the maximum design range over the field of view 324 is about 200 meters or in a range from about 150 meters to about 300 meters.

In some embodiments, the vehicle includes ancillary sensors (not shown), such as a GPS sensor, odometer, tachometer, temperature sensor, vacuum sensor, electrical voltage or current sensors, among others well known in the art. In some embodiments, a gyroscope 330 is included to provide rotation information.

Figure 3B:
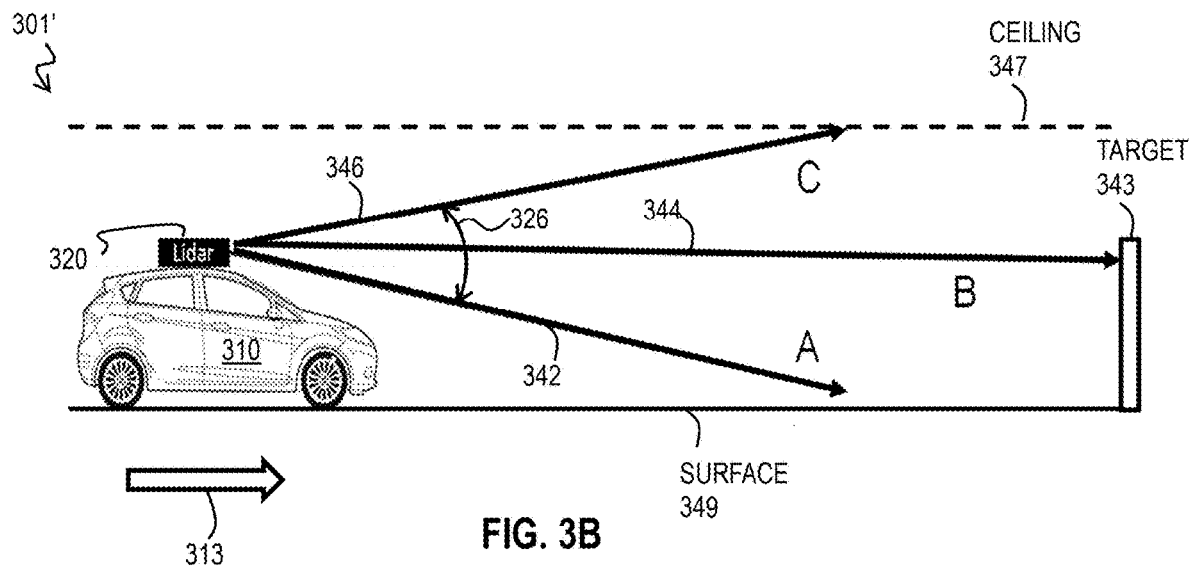
FIG. 3B is a block diagram that illustrates an example system that includes at least one hi-res LIDAR system mounted on a vehicle, according to an embodiment.

FIG. 3B is a block diagram that illustrates an example system 301' that includes at least one hi-res LIDAR system 320 mounted on the vehicle 310, according to an embodiment. In an embodiment, the LIDAR system 320 is similar to the system 200 or system 200' or system 200". In one embodiment, the vehicle 310 moves over the surface 349 (e.g. road) with the forward direction based on the arrow 313. The LIDAR system 320 scans over a range of angles 326 from a first beam 342 oriented at a first angle measured with respect to the arrow 313 to a second beam 346 oriented at a second angle measured with respect to the arrow 313. In one embodiment, the first angle and the second angle are vertical angles within a vertical plane that is oriented about orthogonal with respect to the surface 349. For purposes of this description, "about orthogonal" means within ±20 degrees of a normal to the surface 349. In some embodiments, where the LIDAR system 320 is similar to the system 200", the range of angles 326 is defined by the range of angles 227.

In designing the system 301', a predetermined maximum design range of the beams at each angle is determined and represents a maximum anticipated target range at each angle in the range 326. In other embodiments, the maximum design range at each angle is not predetermined but is regularly measured and updated in the memory of the processing system 250 at incremental time periods. In an embodiment, the first beam 342 is oriented toward the surface 349 and intersects the surface 349 within some maximum design range from the vehicle 310. Thus, at the first angle the system 320 does not consider targets positioned beyond the surface 349. In an example embodiment, the first angle of the first beam 342 is about −15 degrees or in a range from about −25 degrees to about −10 degrees with respect to the arrow 313 and the maximum design range is about 4 meters (m) or within a range from about 1 m to about 10 m or in a range from about 2 m to about 6 m. In an embodiment, the second beam 346 is oriented toward the sky and intersects a ceiling 347 within some maximum design range from the vehicle 310. Thus, at the second angle the system 320 does not consider targets positioned above the ceiling 347. In an example embodiment, the ceiling 347 is at an altitude of about 12 m or in a range from about 8 m to about 15 m from the surface 349 (e.g. that defines an altitude of 0 m), the second angle of the second beam 346 is about 15 degrees or in a range from about 10 degrees to about 20 degrees with respect to the arrow 313 and the maximum design range is about 7 m or within a range from about 4 m to about 10 m or within a range from about 1 m to about 15 m. In some embodiments, the ceiling 347 altitude depends on an altitude of the LIDAR system 320 (e.g. about 1.5 m or in a range of about 1 m to about 4 m, where the surface 349 defines 0 m). In an embodiment, an intermediate beam 344 between the first beam 342 and second beam 346 is oriented about parallel with the arrow 313 and intersects a target 343 positioned at a maximum design range from the vehicle 310. In one example embodiment, FIG. 3B is not drawn to scale and target 343 is positioned at a much further distance from the vehicle 310 than depicted. For purposes of this description, "about parallel" means within about ±10 degrees or within about ±15 degrees of the arrow 313. In an example embodiment, the maximum design range of the target 343 is about 200 m or within a range from about 150 m to about 300 m or within a range from about 100 m to about 500 m.

Although FIG. 3B depicts the LIDAR system mounted on a vehicle 310 configured to travel over the surface 349, the embodiments of the present is not limited to this type of vehicle and the LIDAR system can be mounted to an air vehicle 310' (e.g. passenger air vehicle) that is configured to fly. In an embodiment, the vehicle 310' is configured to fly over a surface 349 where one or more targets 343 are present. FIG. 3D is a block diagram that illustrates an example system 301" that includes at least one hi-res LIDAR system 320 mounted on a vehicle 310' configured to fly over a surface 349, according to an embodiment. In an embodiment, the LIDAR system 320 operates in a similar manner as the LIDAR system 320 of the system 301', with the exception that the maximum design range of the first beam 342' at the first angle with respect to the arrow 313 is defined based on a floor 348 relative to the surface 349. In an example embodiment, the floor 348 has an altitude relative to the altitude of the system 320 in a range from about 0 m to about −10 m or in a range from about 0 m to about −2 m. In another example embodiment, the ceiling 347 has an altitude relative to the altitude of the system 320 in a range from about 0 m to about 10 m. In another example embodiment, the first angle is about −30 degrees or within a range from about −60 degrees to about −15 degrees. In some embodiments, the first angle would be equal and opposite to the second angle of the ceiling 347.

6. Method for Optimization of Scan Pattern in Coherent LIDAR System

Figure 6:
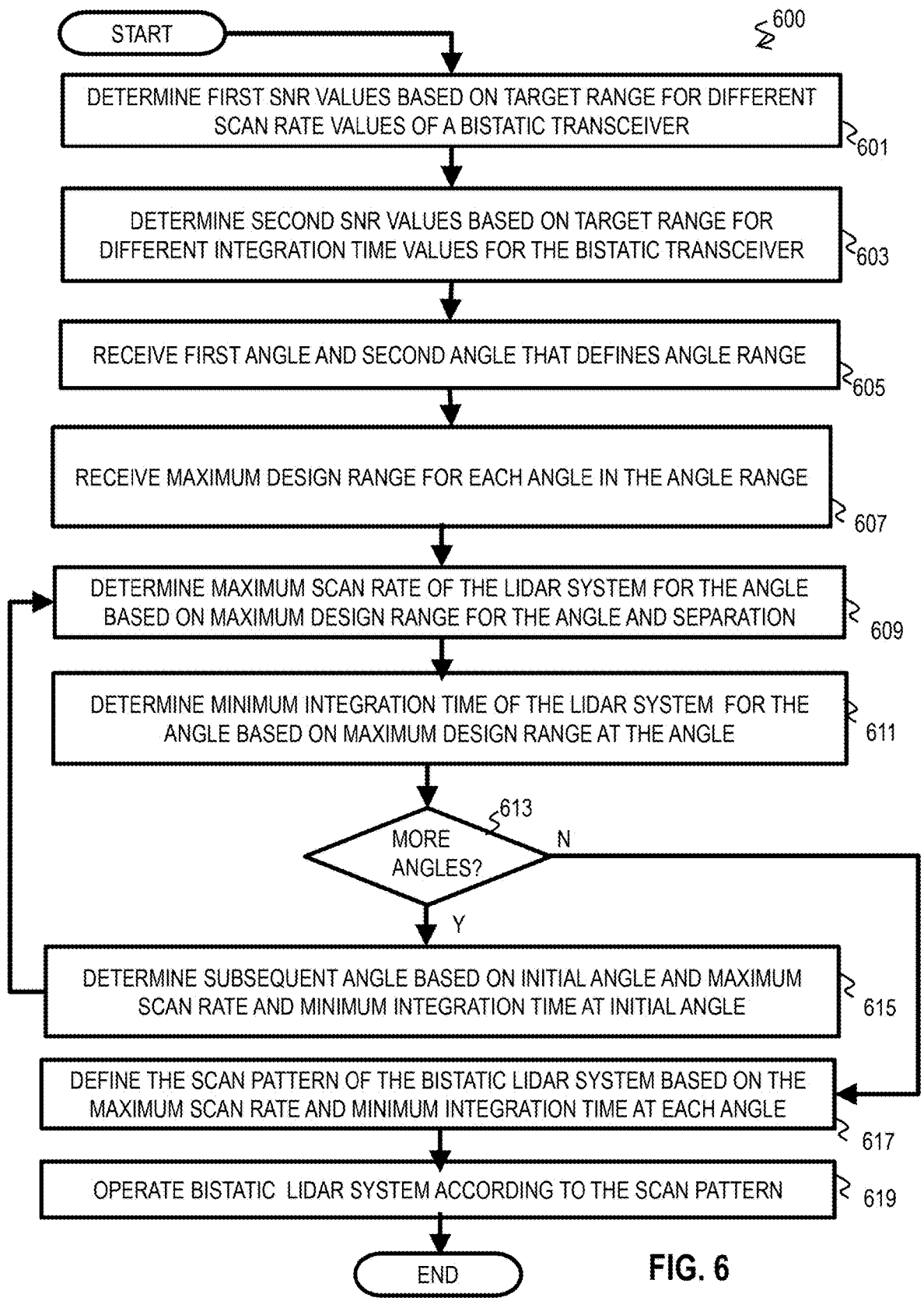
FIG. 6 is a flow chart that illustrates an example method for optimizing a scan pattern of a LIDAR system, according to an embodiment.

FIG. 6 is a flow chart that illustrates an example method 600 for optimizing a bistatic scan pattern of a LIDAR system. In some embodiments, the system 600 is for optimizing the scan pattern of a LIDAR system mounted on an autonomous vehicle. Although steps are depicted in FIG. 6 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 601, data is received on a processor that indicates first SNR values of a signal reflected by a target and received by a receiving waveguide of a bistatic transceiver after the signal is transmitted by a transmission waveguide of the bistatic transceiver, where the receiving waveguide is spaced apart from the transmission waveguide by a separation. The first SNR values are based on values of a range of the target and the first SNR values are for a respective value of a scan rate of the LIDAR system. In an embodiment, in step 601 the first SNR values are of the return beam 291' reflected by the target and received by the receiving waveguide 225 of the bistatic transceiver 215 after the beam 205' is transmitted by the transmission waveguide 223, where the receiving waveguide 225 is spaced apart from the transmission waveguide 223 by the separation 221. In one embodiment, the data is first SNR values of the focused return beam 291' on the tip 217 of either or both of the receiving waveguides 225a, 225b in the system 200". In another embodiment, in step 601 the data is first SNR values of the focused return beam 291' on the detector array 230 in the system 200". In one embodiment, the data includes values of trace 440b and/or trace 440c and/or trace 440d that indicate SNR values of the return beam 291', where each trace 440 is for a respective value of the scan rate of the beam. In an example embodiment, the traces 440b, 440c, 440d are based on the same value of the separation 221 and in step 601 a plurality of sets of traces 440b, 440c, 440d are received for a respective plurality of values of the separation 221. In some embodiments, the data is not limited to traces 440b, 440c, 440d and includes SNR values of less or more traces than are depicted in FIG. 4G, where each SNR trace is based on a respective value of the scan rate and/or the traces 440b, 440c, 440d are based on a particular value of the separation 221.

In other embodiments, the data received in step 601 includes SNR values that could be used to form the trace over the target range for each respective value of the scan rate and/or each value of the separation 221. In one embodiment, traces 464, 466 are provided based on a fixed value of the scan rate (e.g. 4000 deg/sec) and for multiple values of the separation 221. In another embodiment, traces 465, 467 are provided based on a fixed value of the scan rate (e.g. 12000 deg/sec) and for multiple values of the separation 221. In yet another embodiment, in step 601 traces 469 are provided for a respective target range in order to achieve an SNR threshold and the traces 469 indicate a required separation 221 value for a particular fixed scan speed. In an example embodiment, in step 601 the data is stored in a memory of the processing system 250 and each set of first SNR values is stored with an associated value of the scan rate of the LIDAR system and/or an associated value of the separation 221. In one embodiment, in step 601 the first SNR values are obtained over a range from about 0 meters to about 500 meters (e.g. automotive vehicles) or within a range from about 0 meters to about 1000 meters (e.g. airborne vehicles) and for scan rate values from about 2000 deg/sec to about 6000 deg/sec or within a range from about 1000 deg/second to about 7000 deg/sec and/or for separation 221 values in a range from about 0 $w_o$ to 4 $w_o$ or from about 0 $w_o$ to about 10 $w_o$ where $w_o$ is the diameter of the transmission waveguide 223. In some embodiments, the first SNR values are predetermined and are received by the processor in step 601. In other embodiments, the first SNR values are measured by the LIDAR system and subsequently received by the processor in step 601. In one embodiment, the data is input in step 601 using an input device 712 and/or uploaded to the memory 704 of the processing system 250 over a network link 778 from a local area network 780, internet 790 or external server 792.

In an embodiment, in step 601 the first SNR values (e.g. traces 440b, 440c, 440d) are received for the return beam 291' received by the first receiving waveguide 225a based on the first separation 221a and another set of first SNR values (e.g. traces 440b, 440c, 440d) are received for the return beam 291' received by the second receiving waveguide 225b based on the second separation 221b. In one example embodiment, the first SNR values for the return beam 291' received by the receiving waveguides 225a, 225b are predetermined and received by the processor in step 601. In another example embodiment, the first SNR values for the return beam 291' received by the receiving waveguides 225a, 225b are measured by the LIDAR system and subsequently received by the processor in step 601.

In step 603, data is received on a processor that indicates second SNR values of a signal reflected by a target and detected by the LIDAR system based on values of a range of the target, where the second SNR values are for a respective value of an integration time of the LIDAR system. In an embodiment, in step 603 the data is second SNR values of the focused return beam 291' in the system 200" for a respective integration time over which the beam is processed by the acquisition system 240 and/or processing system 250. In one embodiment, the data includes values of trace 450a and/or trace 450b and/or trace 450c and/or trace 450d that indicate SNR values of the return beam 291', where each trace 450 is for a respective value of the integration time that the beam is processed by the acquisition system 240 and/or processing system 250. In some embodiments, the data is not limited to traces 450a, 450b, 450c, 450d and includes less or more traces than are depicted in FIG. 4I, where each SNR trace is based on a respective value of the integration time. In other embodiments, the data need not be a trace and instead is the SNR values used to form the trace over the target range for each respective value of the integration time. In an example embodiment, in step 603 the data is stored in a memory of the processing system 250 and each set of second SNR values is stored with an associated value of the integration time of the LIDAR system. In one embodiment, in step 603 the second SNR values are obtained over a range from about 0 meters to about 500 meters (e.g. automotive vehicles) or from a range from about 0 meters to about 1000 meters (e.g. airborne vehicles) and for integration time values from about 100 nanosecond (ns) to about 5 microseconds (µs). In some embodiments, the second SNR values are predetermined and are received by the processor in step 603. In other embodiments, the second SNR values are measured by the LIDAR system and subsequently received by the processor in step 603. In one embodiment, the data is input in step 603 using an input device 712 and/or uploaded to the memory 704 of the processing system 250 over a network link 778 from a local area network 780, internet 790 or external server 792.

In step 605, data is received on a processor that indicates the first angle and the second angle that defines the angle range 227. In one embodiment, in step 605 the first angle and the second angle are input using an input device 712 (e.g. mouse or pointing device 716) and/or are uploaded to the processing system 250 over a network link 778. In one embodiment, where the angle range 227 is the field of view 324 of FIG. 3A, the first angle is defined as the angle between the first beam 322 and the arrow 313 indicating the direction of travel of the vehicle 310 and the second angle is defined as the angle between the second beam 323 and the arrow 313.

In another embodiment, where the angle range 227 is the angle range 326 of FIG. 3B, the first angle is defined as the angle between the first beam 342 and the arrow 313 indicating the direction of travel of the vehicle 310 and the second angle is defined as the angle between the second beam 346 and the arrow 313. In an embodiment, the first angle and second angle are symmetric with respect to the arrow 313, e.g. the first angle and the second angle are equal and opposite to each other. In one embodiment, the first angle is selected so that the first beam 342 is oriented towards the surface 349 and the second angle is selected so that the second beam 346 is oriented away from the surface 349 and towards the ceiling 347.

In one embodiment, steps 601, 603 and 605 are simultaneously performed in one step where the data in steps 601, 603 and 605 is received at the processor in one simultaneously step.

In step 607, data is received on a processor that indicates the maximum design range of the target at each angle in the angle range. In an embodiment, the maximum design range is the predetermined maximum range of the target at each angle in the range of angles 227. In one embodiment, in step 607 the maximum design range of the target at each angle is based on the field of view 324 of FIG. 3A. In an example embodiment, the maximum design range is a fixed value or a fixed range of values over the field of view 324. In an example embodiment, the maximum design range over the field of view 324 is about 250 meters or in a range from about 150 meters to about 300 meters.

In another embodiment, the data in step 607 is provided over a first range of angles that is greater than the range of angles 326. In one embodiment, the data in step 607 is provided at an incremental angle over the angle range, wherein the incremental angle is selected in a range from about 0.005 degrees to about 0.01 degrees or in a range from about 0.0005 degrees to about 0.01 degrees.

In one example embodiment, the data in step 607 is input using an input device 712 (e.g. mouse or pointing device 716) and/or are uploaded to the processing system 250 over a network link 778. In some embodiments, the maximum design range is predetermined and received during step 607. In other embodiments, the system 200, 200', 200" is used to measure the maximum design range at each angle in the angle range 227 and the maximum design range at each angle is subsequently received by the processing system 250 in step 607.

In step 609, a maximum scan rate of the LIDAR system is determined at each angle in the angle range 227 so that the SNR of the LIDAR system is greater than a minimum SNR threshold. In an embodiment, in step 609 a fixed maximum scan rate is determined for the angles in the angle range 227. A range of values for the maximum design range over the angle range 227 is first determined based on the received data in step 607. First SNR values received in step 601 are then determined for the value or range of values of the maximum design range (e.g. about 150 m to about 300 m) over the angle range 227 and it is further determined which of these first SNR values exceed the minimum SNR threshold. In one embodiment, values of traces 440b, 440c, 440d are determined for the range of values of the maximum design range (e.g. about 80 m-about 120 m) over the angle range 227 and it is further determined that only the values of trace 440d exceeds the minimum SNR threshold 442 for the range of values of the maximum design range (e.g. about 80 m-about 120 m). Since only the values of trace 440d exceeds the minimum SNR threshold 442, the fixed maximum scan rate over the angle range 227 is set to the scan rate corresponding to the trace 440d. In an example embodiment, the determining of the maximum scan rate in step 609 ensures that beam walkoff 419, 421 (FIG. 4E) of the return beam 291' on the tip 217 of the receiving waveguides 225a, 225b is within a threshold of the separation 221, where the threshold is based on a diameter of the image 418 of the return beam 291' on the tip (e.g. larger threshold for larger diameter, smaller threshold for smaller diameter). In an example embodiment, the threshold is a ratio of a diameter of the image 418 of the return beam 291' on the tip 217 of the receiving waveguide 225. In an example embodiment, the ratio is about 0.5 or in a range from about 0.3 to about 0.7.

In another embodiment, in step 609, first SNR values (e.g. traces 464, 465, 466, 467, 469) corresponding to different values of the separation 221 are used to determine first SNR values (e.g. one of the traces 464 for fixed scan speed 4000 deg/sec or one of traces 465 for fixed scan speed 12000 deg/sec) that exceeds the minimum SNR threshold 442 and is the maximum value among those first SNR values which exceed the minimum SNR threshold 442. In an embodiment, during a design phase of the system 200" the separation 221 between the transmission waveguide 223 and the receiving waveguide 225 is selected based on the value of the separation 221 corresponding to the determined first SNR values and the fixed maximum scan rate is selected based on the scan rate corresponding to the determined first SNR values (e.g. the value of the separation 221 is selected at 2.75 $w_o$ based on trace 465c for target design range of 0 m-250 m and/or the fixed scan rate is selected based on the fixed scan rate of 12,000 deg/sec for traces 465). In one example embodiment, first SNR values (e.g. traces 464c) corresponding to the first separation 221a (e.g. 0.25 $w_o$) is used for a fixed scan rate (e.g. 4000 deg/sec) so that the SNR exceeds the SNR threshold 442 over a first portion of the angle range 227 (e.g. for target range >80 m) and first SNR values (e.g. trace 464a) corresponding to the second separation 221b (e.g. 4 $w_o$) is used for the fixed scan rate so the SNR exceeds the SNR threshold 442 over a second portion of the angle range 227 (e.g. for target range <80 m). In this embodiment, the fixed maximum scan rate over the angle range 227 is set to the optimal scan rate. This embodiment advantageously uses multiple receiving waveguides 225a, 225b to detect return beam 291' data from different portions of the maximum design range (e.g. receiving waveguide 225a receives return beams 291' from targets at longer range, receiving waveguide 225b receives return beams 291' from targets at shorter range) over the angle range 227 while the scan rate is fixed over the angle range 227. In an example embodiment, where the angle range 227 is the angle range 326, the receiving waveguide 225b receives return beams 291' based on the transmitted beams 342, 346 at the first and second angles and the receiving waveguide 225a receives return beams 291' based on the intermediate transmitted beam 344.

In another embodiment, in step 609 a respective maximum scan rate is determined for each angle in the angle range 227. At each angle, the maximum design range for that angle is first determined based on the received data in step 607. First SNR values received in step 601 are then determined for the maximum design range at the angle and it is further determined which of these first SNR values exceed the minimum SNR threshold. In one embodiment, values of traces 440b, 440c, 440d are determined for a maximum design range (e.g. about 90 m) and it is further determined that the values of traces 440b, 440c exceeds the minimum SNR threshold 442. Among those first SNR values which exceed the minimum SNR threshold, the first SNR values with the maximum scan rate is selected and the maximum scan rate is determined in step 609 for that angle. In the above embodiment, among the values of the traces 440b, 440c which exceeds the minimum SNR threshold 442 at the maximum design range (e.g. about 90 m), the trace 440c values are selected as the maximum scan rate and the maximum scan rate (e.g. optimal scan rate associated with trace 440c) is determined in step 609 for that angle. In one example embodiment, FIG. 4G depicts that the maximum scan rate determined in step 609 for the beams 342, 346 at the first and second angle (e.g. optimal scan rate based on trace 440c) is greater than the maximum scan determined in step 609 for beam 344 at an angle between the first and second angle (e.g. slow scan rate based on trace 440b). In this example embodiment, the scan rate of the scanning optics 218 is varied over the angle range 227 and the return beam 291' is scanned at a fast scan rate for that portion of the angle range 227 corresponding to shorter target range (e.g. beams 342, 346) and is scanned at a slow scan rate for that portion of the angle range 227 corresponding to a longer target range (e.g. beam 344). In this example embodiment, one receiving waveguide 225 is used to capture returns beams 291' over the angle range 227. In an example embodiment, the determining of the maximum scan rate in step 609 ensures that beam walkoff 419 (FIG. 4E) of the return beam 291' on the tip 217 of the receiving waveguide 225 is within a threshold of the separation 221, where the threshold is less than a ratio of a diameter of the image 418 of the return beam 291' on the tip 217. In an example embodiment, the ratio is about 0.5 or in a range from about 0.3 to about 0.7.

Figure 3C:
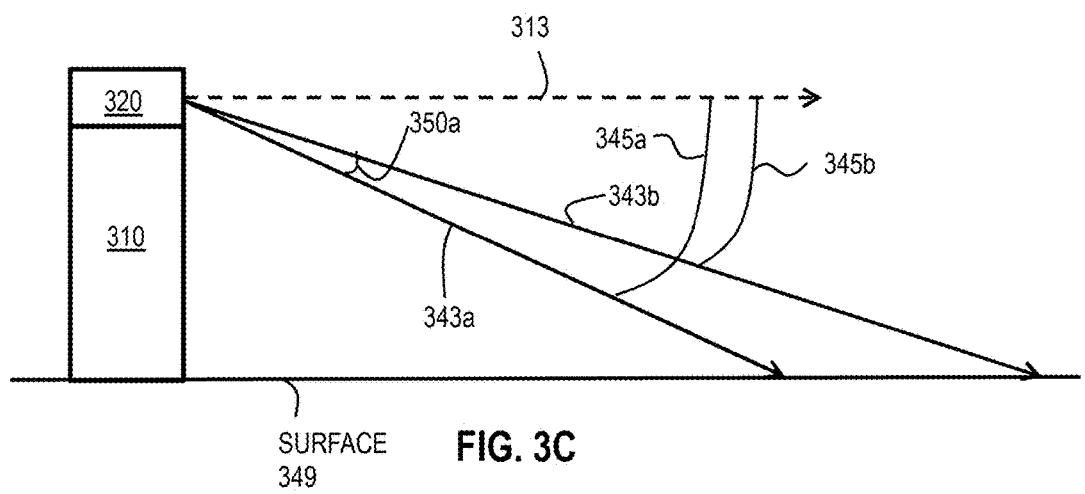
FIG. 3C is a block diagram that illustrates an example of transmitted beams at multiple angles from the LIDAR system of FIG. 3B, according to an embodiment.
Figure 3D:
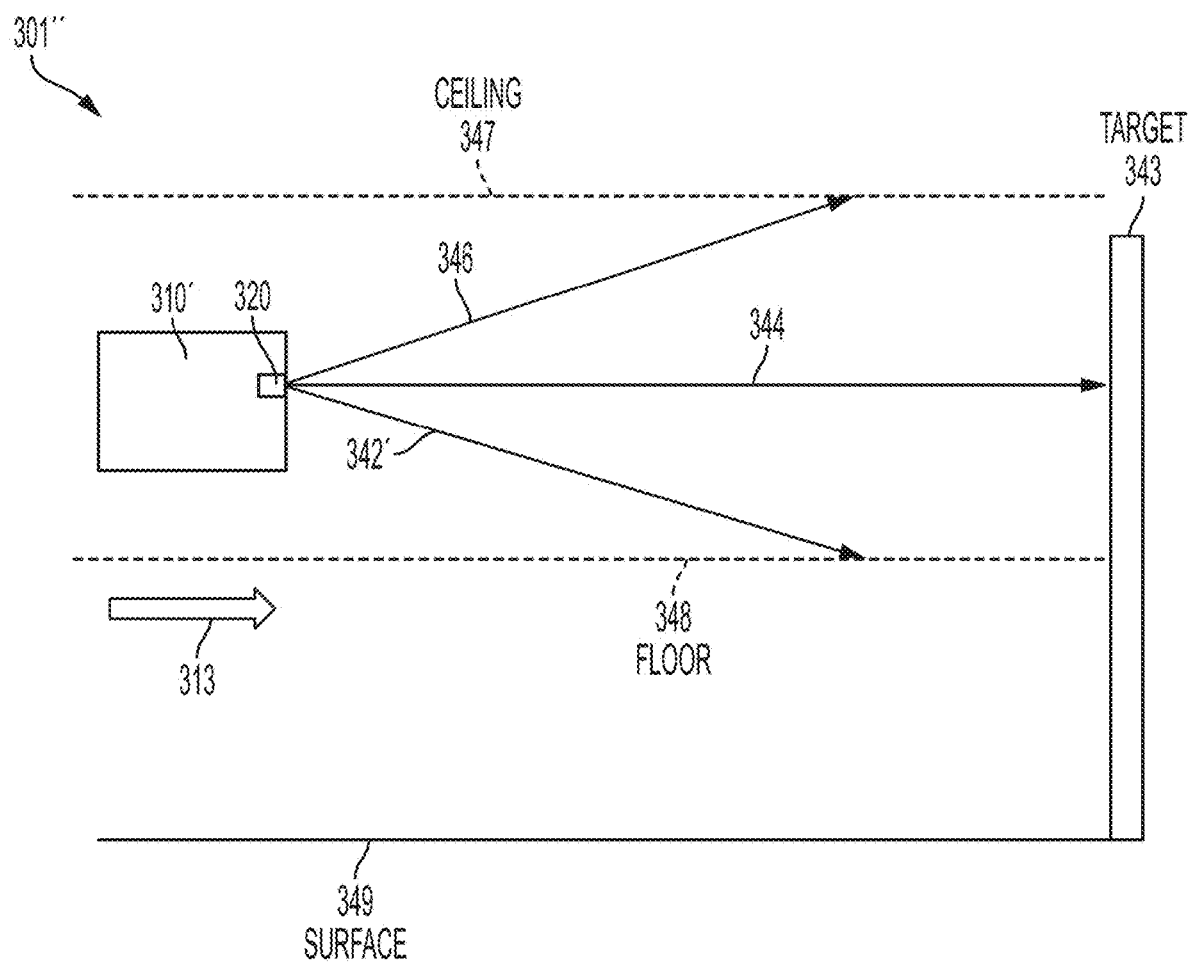
FIG. 3D is a block diagram that illustrates an example system that includes at least one hi-res LIDAR system mounted on a vehicle, according to an embodiment.

FIG. 3C is a block diagram that illustrates an example of transmitted beams 343a, 343b at multiple angles 345a, 345b from the LIDAR system 320 of FIG. 3B, according to an embodiment. In one embodiment, beams 343a, 343b are intermediate beams between first beam 342 and intermediate beam 344. In other embodiments, beam 343a is the first beam 342 and beam 343b is a subsequent beam that is processed after the first beam 342. In step 609, the maximum scan rate of the LIDAR system 320 is determined at the angle 345a. The maximum design range (e.g. 30 m) of the beam 343a at the angle 345a is first determined using the data in step 607. First SNR values from step 601 for the maximum design range are then determined. In an example embodiment, the first SNR values include values of traces 440b, 440c, 440d. It is then determined which of those first SNR values at the maximum design range exceeds the minimum SNR threshold. In the example embodiment, the values of the traces 440b, 440c, 440d at the maximum design range (e.g. 30 m) all exceed the minimum SNR threshold 442. It is then determined which of these first SNR values has the maximum scan rate and this maximum scan rate is determined in step 609 for that angle. In the example embodiment, the trace 440c has the maximum scan rate and thus this maximum scan rate is used to scan the beam 343a at the angle 345a. In an embodiment, FIG. 4I depicts that the minimum scan rate determined in step 611 for the beams 342, 346 at the first and second angle (e.g. 400 ns based on trace 450d) is shorter than the minimum integration time determined in step 611 for beam 344 at an angle between the first and second angle (e.g. 3.2 μs based on trace 450a).

In step 611, a minimum integration time of the LIDAR system is determined at each angle in the angle range 227 so that the SNR of the LIDAR system is greater than a minimum SNR threshold. In some embodiments, where the maximum design range has a fixed value or a fixed range of values over the angle range 227, in step 611 a fixed minimum integration time is determined over the angle range 227 based on the fixed maximum design range (e.g. 200 m) or fixed range of values of the maximum design range (e.g. 180 m-220 m). In other embodiments, at each angle in the angle range 227, the maximum design range for that angle is first determined based on the received data in step 607. Second SNR values received in step 603 are then determined for the maximum design range at the angle and it is further determined which of these second SNR values exceed the minimum SNR threshold. In one embodiment, values of traces 450a, 450b, 450c, 450d are determined for a maximum design range (e.g. about 120 m) or range of values for the maximum design range and it is further determined that the values of traces 450a, 450b, 450c exceeds the minimum SNR threshold 452. Among those second SNR values which exceed the minimum SNR threshold, the second SNR values with the minimum integration time is selected and the minimum integration time is determined in step 611 for that angle or range of angles 227. In the above embodiment, among the values of the traces 450a, 450b, 450c which exceeds the minimum SNR threshold 452 at the maximum design range (e.g. about 120 m), the trace 450c values are selected with the minimum integration time and the minimum integration time (e.g. about 800 ns) is determined in step 611 for that angle.

In step 611, the minimum integration time of the LIDAR system 320 is determined at the angle 345a. The maximum design range (e.g. 30 m) of the beam 343a at the angle 345a is first determined using the data in step 607. Second SNR values from step 603 for the maximum design range are then determined. In an example embodiment, the second SNR values include values of traces 450a, 450b, 450c, 450d. It is then determined which of those second SNR values at the maximum design range exceeds the minimum SNR threshold. In the example embodiment, the values of the traces 450a, 450b, 450c, 450d at the maximum design range (e.g. 30 m) all exceed the minimum SNR threshold 452. It is then determined which of these second SNR values has the minimum integration time and this minimum integration time is determined in step 611 for that angle. In the example embodiment, the trace 450d has the minimum integration time (e.g. about 400 ns) and thus this minimum integration time is used to process the beam 343a at the angle 345a.

In step 613, a determination is made whether additional angles remain in the angle range 227 to perform another iteration of steps 609, 611. In some embodiments, where the maximum design range has a fixed value or a fixed range of values over the angle range 227, steps 609, 611 are each performed once based on this fixed value or fixed range of values of the maximum design range, steps 613 and 615 are omitted and the method 600 proceeds to step 617. In this embodiment, a fixed maximum scan rate is determined in step 609, based on the fixed value or fixed range of values of the maximum design range and a fixed minimum integration time is determined in step 611 based on the fixed value or fixed range of values of the maximum design range.

In one embodiment, in step 613 for the angle range 326, where an initial iteration of steps 609, 611 was at the first angle of the first beam 342 in the range 326, step 613 involves a determination of whether the previous iteration of steps 609, 611 was at or beyond the second angle of the second beam 346 in the angle range 326. In another embodiment, where an initial iteration of the steps 609, 611 was at the second angle of the range 326, step 613 involves a determination of whether the previous iteration of steps 609, 611 was at or beyond the first angle of the angle range 326. If step 613 determines that more angles in the range 326 remain, the method proceeds to block 615. If step 613 determines that no further angles in the range 326 remain, the method proceeds to block 617.

In step 615, a determination is made of a subsequent angle at which to iterate steps 609, 611 after having performed a previous iteration of steps 609, 611 at an initial angle. In an embodiment, FIG. 3C depicts a subsequent angle 345b of the subsequent beam 343b at which to iterate steps 609, 611 after having performed the previous iteration of steps 609, 611 at the initial beam 343a at the initial angle 345a. In an embodiment, step 615 involves a determination of the subsequent angle 345b and angle increment 350a between the initial angle 345a and the subsequent angle 345b. In one embodiment, the subsequent angle 345b is based on the initial angle 345a, the maximum scan rate at the angle 345a determined in step 609 and the minimum integration time at the angle 345a determined in step 611. In an example embodiment, the subsequent angle $\theta_s$ is based on the initial angle $\theta_i$, maximum scan rate $S_m$ and minimum integration time $I_m$ using:

$$\theta_s = \theta_i + S_m I_m \qquad (6)$$

In an example embodiment, if the initial angle 345a is −15 degrees, the maximum scan rate is 15 degrees per second and the minimum integration time is 2 μs, then the subsequent angle 345b is about −14.97 degrees using equation 6. After determining the subsequent angle in step 615, the method proceeds back to block 609 so that steps 609, 611 are iterated at the subsequent angle.

In step 617, after it is determined that no further iterations of steps 609, 611 need to be performed, a scan pattern of the LIDAR system is defined based on the maximum scan rate from step 609 and the minimum integration time from step 611 at each angle in the angle range 326. In some embodiments, where the maximum design range has a fixed value or a fixed range of values over the angle range 227, the fixed maximum scan rate is determined in step 609, based on the fixed value or fixed range of values of the maximum design range and the fixed minimum integration time is determined in step 611 based on the fixed value or fixed range of values of the maximum design range. In this embodiment, in step 617 the scan pattern is defined based on the fixed maximum scan rate and the fixed minimum integration time at each angle over the angle range 227.

In another embodiment, the scan pattern includes the maximum scan pattern and minimum integration time for each angle in the angle range 326 between the first angle of the first beam 342 and the second angle of the second beam 346. In an example embodiment, the scan pattern is stored in a memory (e.g. memory 704) of the processing system 250. In another example embodiment, the angle increments between adjacent angles in the scan pattern is determined in step 615, e.g. the angle increment is the spacing between the subsequent angle and the initial angle in step 615. In another example embodiment, FIG. 3C depicts an angle increment 350a between a subsequent angle 345b and an initial angle 345a for purposes of step 615 and the scan pattern determined in step 617.

In step 619, the LIDAR system is operated according to the scan pattern determined in step 617. In one embodiment, where the maximum design range has a fixed value or a fixed range of values over the angle range 227, the fixed maximum scan rate is determined in step 609, based on the fixed value or fixed range of values of the maximum design range. In this embodiment, in step 619 the beam of the LIDAR system is scanned at the fixed maximum scan rate using the scanning optics 218 over the angle range 227. In an example embodiment, in step 619 the beam 205" is scanned using the polygon scanner 244 at the fixed maximum scan rate. In one embodiment, the processing system 250 transmits a signal to the polygon scanner 244 to cause the polygon scanner 244 so that the speed of the angular velocity 249 is the fixed maximum scan rate. Additionally, in this embodiment, the minimum integration time of the LIDAR system is based on the fixed minimum integration time based on the fixed value or fixed range of values for the maximum design range. In an embodiment, the beam 205" is scanned continuously over the angle range 227 as the beam 205" is scanned by adjacent facets 245 of the polygon scanner 244. Thus, in an example embodiment, the beam 205" is scanned by the facet 245a over the angle range 227 and the beam 205" is subsequently scanned by the facet 245b over the angle range 227. During step 619, the return beam 291' is focused by the collimation optic 229 into the tip 217 of the receiving waveguide 225. In an example embodiment, where multiple receiving waveguides 225a, 225b are provided, the return beams 291' are focused into the tip 217 of the first receiving waveguide 225a when the beam 205" is scanned at the fixed maximum scan rate over a first portion of the angle range 227 (e.g. further target range; beam 344) and the return beams 291' are focused into the tip of the second receiving waveguide 225b when the beam 205" is scanned at the fixed maximum scan rate over a second portion of the angle range 227 (e.g. shorter target range; beams 342, 346). In another example embodiment, one receiving waveguide 225a and the receiving waveguide 225b is omitted and the return beams 291' are received in the tip of the receiving waveguide 225a as the beam 205" is scanned at the fixed maximum scan rate over the angle range 227 (e.g. field of view 324).

In step 619, one or more parameters of the LIDAR system are selected during a design phase of the system 200". In an example embodiment, a value of the separation 221 between the transmission waveguide 223 and the receiving waveguide 225 is selected based on the use of one or more of the graphs 464, 465, 466, 467, 469 where the user determines a value of the separation 221 based on known values of the design target range and scan speed in order to achieve an SNR threshold of the return beam 291'. In yet another example embodiment, a value of the scan speed of the polygon scanner 244 is selected based on the use of the graphs 464, 465, 466, 467, 469 and graphs 440, where the user determines a value of the scan speed based on known values of the design target range and separation 221 in order to achieve an SNR threshold of the return beam 291'.

In another embodiment, in step 619 the beam of the LIDAR system is scanned in the angle range 326 over one or more cycles, where the scan rate of the beam at each angle is the maximum scan rate in the scan pattern for that angle and the integration time of the LIDAR system at each angle is the minimum integration time for that angle. In one embodiment, in step 619, at each angle the processing system 250 of the LIDAR system transmits one or more signals to the scanning optics 218 so that the scan rate at each angle is the maximum scan rate of the scan pattern for that angle. Additionally, in one embodiment, in step 619, at each angle the processing system 250 of the LIDAR system adjusts the integration time of the acquisition system 240 and/or processing system 250 for the return beam 291 received at each angle so that the integration time is the minimum integration time of the scan pattern for that angle. This advantageously ensures that the beam is scanned at the maximum scan rate and that the return beam is processed at the shortest integration time at each angle, while ensuring the LIDAR system maintains an adequate SNR at each angle.

Figure 5:
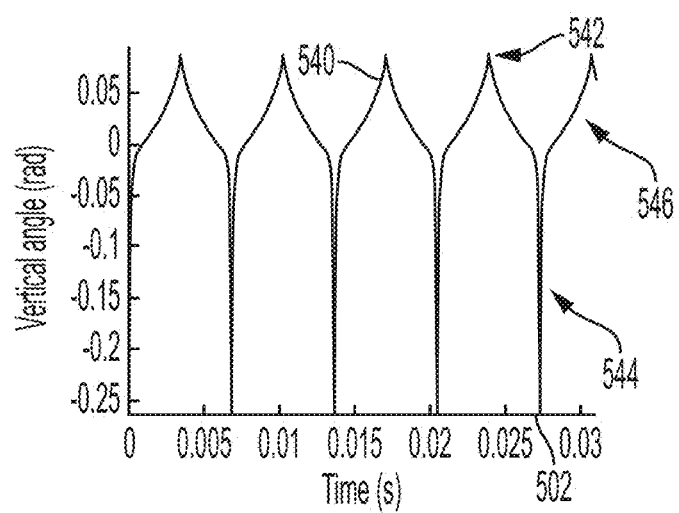
FIG. 5 is a graph that illustrates an example of the vertical angle over time over multiple angle ranges in the system of FIG. 2E, according to an embodiment.

FIG. 5 is a graph that illustrates an example of the vertical angle over time over multiple angle ranges in the system of FIG. 2E, according to an embodiment. The horizontal axis 502 is time in units of seconds (s) and the vertical axis is angle in units of radians (rad). Trace 540 depicts the angle of the beam over time during the scanning over the beam during multiple scan patterns in step 619. A slope of the trace 540 at an instant in time indicates the scan rate of the beam at that time. In an embodiment, region 542 of the trace 540 demonstrates a faster scan rate (e.g. high slope of the trace 540) when the beam is oriented towards the ceiling 347; region 544 of the trace 540 also demonstrates a faster scan rate (e.g. high slope of trace 540) when the beam is oriented towards the surface 349; and region 546 of the trace 540 demonstrates a slower scan rate (e.g. lower slope of the trace 540) when the beam is oriented about parallel with the surface 349. In other embodiments, where the beam 205" is scanned at the fixed maximum scan rate, the trace would demonstrate a fixed slope over the angle range 227.

In another embodiment, during or after step 619, the processor operates the vehicle 310 based at least in part on the data collected by the LIDAR system during step 619. In one embodiment, the processing system 250 of the LIDAR system and/or the processor 314 of the vehicle 310 transmit one or more signals to the steering and/or braking system of the vehicle based on the data collected by the LIDAR system in step 619. In one example embodiment, the processing system 250 transmits one or more signals to the steering or braking system of the vehicle 310 to control a position of the vehicle 310 in response to the LIDAR data. In other embodiments, the processing system 250 transmits one or more signals to the processor 314 of the vehicle 310 based on the LIDAR data collected in step 619 and the processor 314 in turn transmits one or more signals to the steering and braking system of the vehicle 310.

7. Computational Hardware Overview

Figure 7:
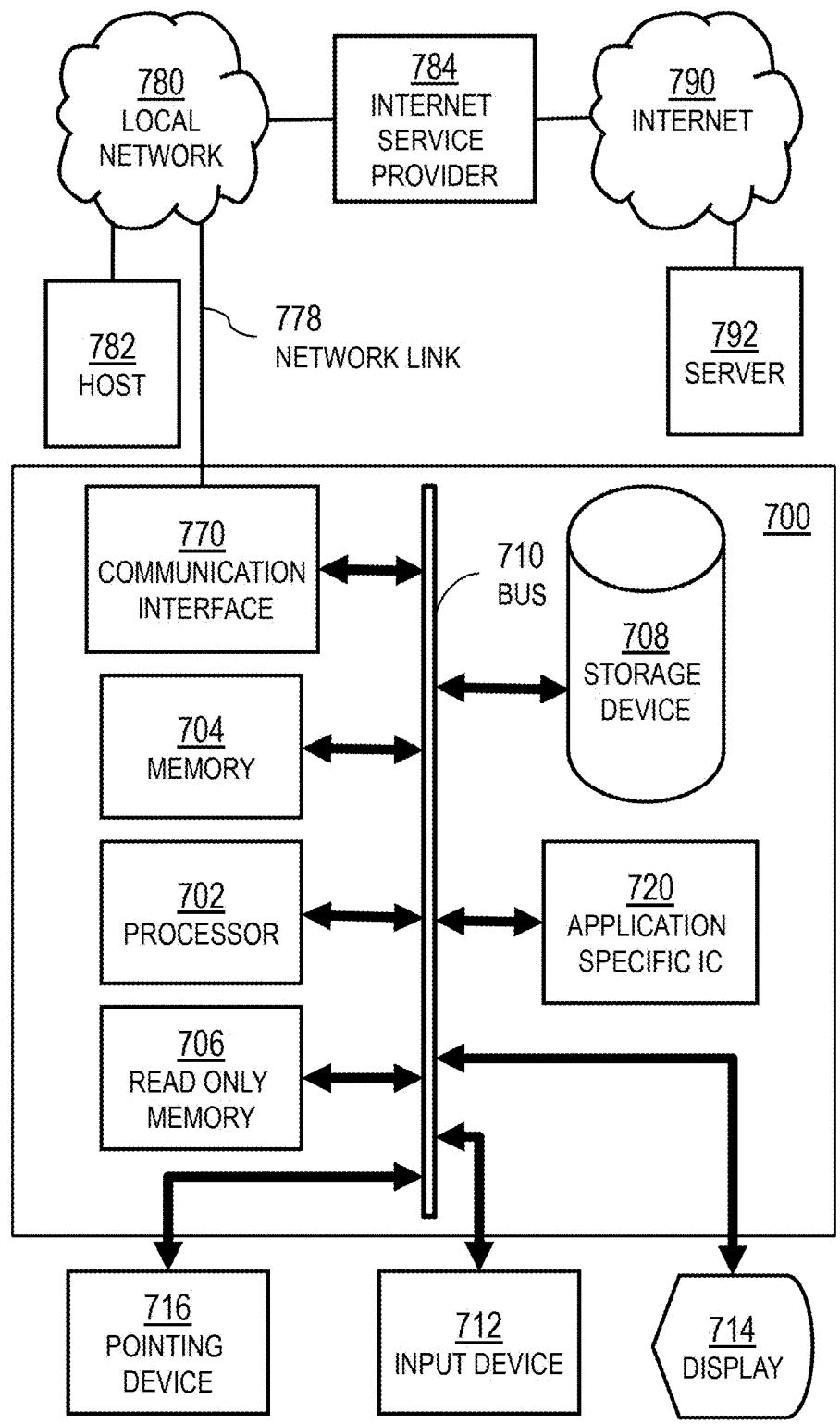
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
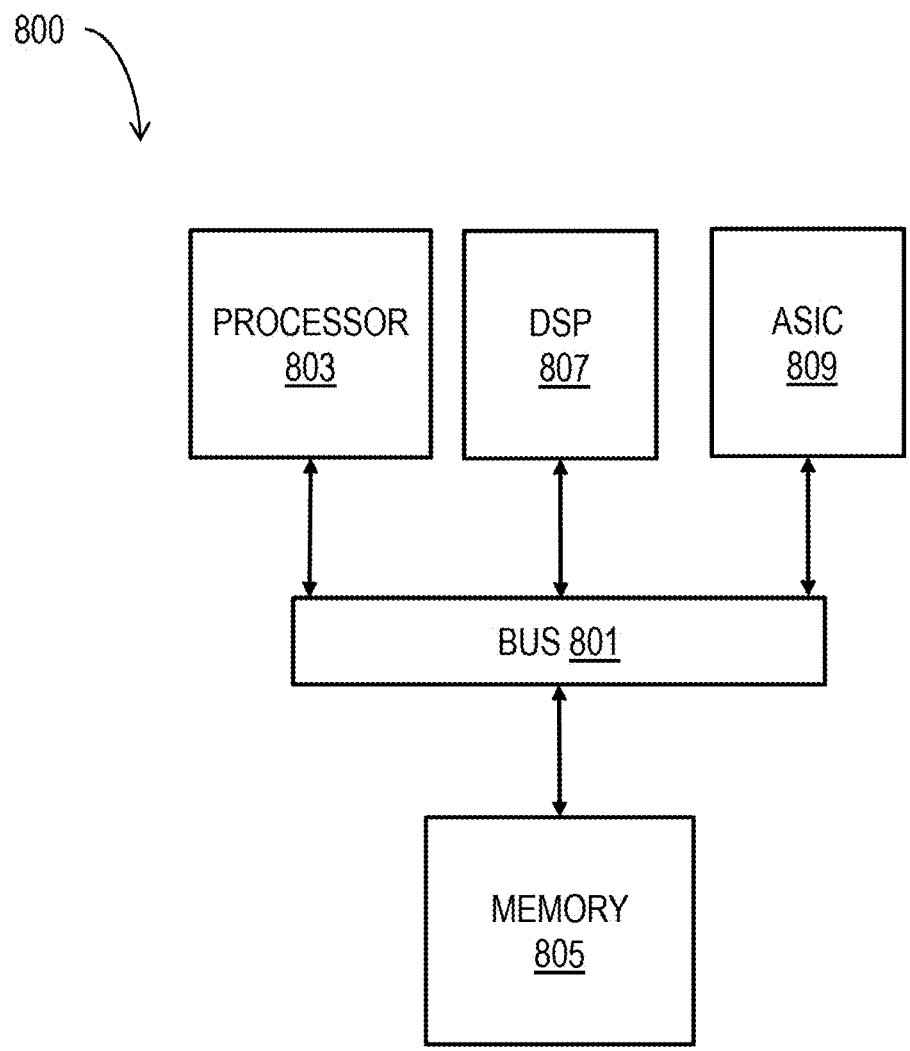
FIG. 8 illustrates a chip set upon which an embodiment of the invention may be implemented.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

8. Alterations, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A light detection and ranging (LIDAR) sensor system for a vehicle, comprising:
   a laser source configured to generate a beam;
   a transmission waveguide configured to output a transmit signal based on the beam;
   one or more scanning optics configured to receive the transmit signal and output the transmit signal at a scan rate toward an object; and
   a receiving waveguide spaced from the transmission waveguide by a distance related to the scan rate and to a target range for detection of the object, the receiving waveguide configured to receive a return signal from reflection or scattering of the transmit signal by the object.

2. The LIDAR sensor system of claim 1, wherein the one or more scanning optics are configured to receive the transmit signal at a first angle and output the transmit signal at the scan rate over an angle range between a second angle and a third angle.

3. The LIDAR sensor system of claim 1, wherein the target range is between about 100 meters and about 300 meters.

4. The LIDAR sensor system of claim 1, wherein the scan rate is between about 1000 degrees per second and about 7000 degrees per second.

5. The LIDAR sensor system of claim 1, further comprising a collimation optic between the one or more scanning optics and the receiving waveguide, the collimation optic configured to focus the return signal from the one or more scanning optics on a tip of the receiving waveguide.

6. The LIDAR sensor system of claim 1, wherein:
   the separation is a first separation, the receiving waveguide is a first receiving waveguide, and the return signal is a first return signal, the first receiving waveguide configured to receive the first return signal at a first range over a first portion of the angle range; and
   the LIDAR sensor system further comprises a second receiving waveguide spaced from the transmission waveguide by a second distance greater than the first distance, the second receiving waveguide configured to receive a second return signal at a second range over a second portion of the angle range.

7. The LIDAR sensor system of claim 1, wherein at least one of the one or more scanning optics comprises a polygon scanner.

8. An autonomous vehicle control system, comprising:
   a laser source configured to generate a beam;
   a transmission waveguide configured to output a transmit signal based on the beam;
   one or more scanning optics configured to receive the transmit signal and output the transmit signal at a scan rate toward an object;
   a receiving waveguide spaced from the transmission waveguide by a distance, the distance related to the scan rate and to a target range for detection of the object, the receiving waveguide configured to receive a return signal from reflection or scattering of the transmit signal by the object; and
   one or more processors configured to:
      determine at least one of a range to the object or a velocity of the object based on the return signal; and
      control operation of an autonomous vehicle based on the at least one of the range or the velocity.

9. The autonomous vehicle control system of claim 8, wherein the one or more scanning optics are configured to receive the transmit signal at a first angle and output the transmit signal at the scan rate over an angle range between a second angle and a third angle.

10. The autonomous vehicle control system of claim 8, wherein the target range is between about 100 meters and about 300 meters.

11. The autonomous vehicle control system of claim 8, wherein the scan rate is between about 1000 degrees per second and about 7000 degrees per second.

12. The autonomous vehicle control system of claim 8, further comprising a collimation optic between the one or more scanning optics and the receiving waveguide, the collimation optic configured to focus the return signal from the one or more scanning optics on a tip of the receiving waveguide.

13. The autonomous vehicle control system of claim 8, wherein:
   the separation is a first separation, the receiving waveguide is a first receiving waveguide, and the return signal is a first return signal, the first receiving waveguide configured to receive the first return signal at a first range over a first portion of the angle range; and
   the LIDAR sensor system further comprises a second receiving waveguide spaced from the transmission waveguide by a second distance greater than the first distance, the second receiving waveguide configured to receive a second return signal at a second range over a second portion of the angle range.

14. The autonomous vehicle control system of claim 8, wherein at least one of the one or more scanning optics comprises a polygon scanner.

15. An autonomous vehicle, comprising:
a LIDAR sensor system comprising:
- a laser source configured to generate a beam;
- a transmission waveguide configured to output a transmit signal based on the beam;
- one or more scanning optics configured to receive the transmit signal and output the transmit signal at a scan rate toward an object;
- a receiving waveguide spaced from the transmission waveguide by a distance, the distance related to the scan rate and to a target range for detection of the object, the receiving waveguide configured to receive a return signal from reflection or scattering of the transmit signal by the object; and
- one or more processors configured to determine at least one of a range to the object or a velocity of the object based on the return signal;

a steering system;
a braking system; and
a vehicle controller configured to control at least one of the steering system or the braking system based on the at least one of the range to the object or the velocity of the object.

16. The autonomous vehicle of claim 15, wherein the one or more scanning optics are configured to receive the transmit signal at a first angle and output the transmit signal at the scan rate over an angle range between a second angle and a third angle.

17. The autonomous vehicle of claim 15, wherein:
the target range is between about 100 meters and about 300 meters; and
the scan rate is between about 1000 degrees per second and about 7000 degrees per second.

18. The autonomous vehicle of claim 15, further comprising a collimation optic between the one or more scanning optics and the receiving waveguide, the collimation optic configured to focus the return signal from the one or more scanning optics on a tip of the receiving waveguide.

19. The autonomous vehicle of claim 15, wherein:
the separation is a first separation, the receiving waveguide is a first receiving waveguide, and the return signal is a first return signal, the first receiving waveguide configured to receive the first return signal at a first range over a first portion of the angle range; and
the LIDAR sensor system further comprises a second receiving waveguide spaced from the transmission waveguide by a second distance greater than the first distance, the second receiving waveguide configured to receive a second return signal at a second range over a second portion of the angle range.

20. The autonomous vehicle of claim 15, wherein at least one of the one or more scanning optics comprises a polygon scanner.

* * * * *